(12) United States Patent
Freydina

(10) Patent No.: US 11,482,710 B2
(45) Date of Patent: Oct. 25, 2022

(54) NANOFIBER ELECTRODES FOR BATTERIES AND METHODS OF MAKING NANOFIBER ELECTRODES

(71) Applicant: WELLSTAT BIOCATALYSIS, LLC, Rockville, MD (US)

(72) Inventor: Evgeniya Freydina, Acton, MA (US)

(73) Assignee: Wellstat BioCatalysis, LLC, Rockville, MD (US)

( * ) Notice: Subject to any disclaimer, the term of this patent is extended or adjusted under 35 U.S.C. 154(b) by 0 days.

(21) Appl. No.: 16/914,789

(22) Filed: Jun. 29, 2020

(65) Prior Publication Data

US 2020/0365907 A1    Nov. 19, 2020

Related U.S. Application Data

(63) Continuation of application No. 15/899,408, filed on Feb. 20, 2018, now Pat. No. 10,700,359, which is a
(Continued)

(51) Int. Cl.
*H01M 4/66* (2006.01)
*H01M 4/62* (2006.01)
(Continued)

(52) U.S. Cl.
CPC ............ *H01M 4/663* (2013.01); *H01G 11/26* (2013.01); *H01G 11/36* (2013.01); *H01G 11/38* (2013.01); *H01G 11/40* (2013.01); *H01G 11/84* (2013.01); *H01G 11/86* (2013.01); *H01M 4/0402* (2013.01); *H01M 4/244* (2013.01); *H01M 4/26* (2013.01); *H01M 4/32* (2013.01); *H01M 4/366* (2013.01); *H01M 4/62* (2013.01); *H01M 4/625* (2013.01); *H01M 10/26* (2013.01);
(Continued)

(58) Field of Classification Search
None
See application file for complete search history.

(56) References Cited

U.S. PATENT DOCUMENTS 9,911,980 B2    3/2018 Freydina
10,700,359 B2   6/2020 Freydina
(Continued)

OTHER PUBLICATIONS

EPO, European Search Rpt, dated Dec. 8, 2016.

*Primary Examiner* — Christopher P Domone
(74) *Attorney, Agent, or Firm* — Laura L. Lee

(57) ABSTRACT

Provided herein is a battery and an electrode. The battery may include two electrodes; and an electrolyte, wherein at least one electrode further includes: a nano-scale coated network, which includes one or more first carbon nanotubes electrically connected to one or more second carbon nanotubes to form a nano-scale network, wherein at least one of the one or more second carbon nanotubes is in electrical contact with another of the one or more second carbon nanotubes. The battery may further include an active material coating distributed to cover portions of the one or more first carbon nanotubes and portions of the one or more second carbon nanotubes, wherein a plurality of the one or more second carbon nanotubes are in electrical communication with other second carbon nanotubes under the active material coating. Also provided herein is a method of making a battery and an electrode.

20 Claims, 13 Drawing Sheets

110

120

Related U.S. Application Data continuation of application No. 14/774,755, filed as application No. PCT/US2014/024468 on Mar. 12, 2014, now Pat. No. 9,911,980.

(60) Provisional application No. 61/786,833, filed on Mar. 15, 2013.

(51) Int. Cl.

| | | |
|---|---|---|
| H01M 10/30 | (2006.01) | |
| H01G 11/26 | (2013.01) | |
| H01G 11/36 | (2013.01) | |
| H01G 11/38 | (2013.01) | |
| H01G 11/84 | (2013.01) | |
| H01M 4/24 | (2006.01) | |
| H01M 4/26 | (2006.01) | |
| H01M 4/32 | (2006.01) | |
| H01M 10/26 | (2006.01) | |
| H01G 11/40 | (2013.01) | |
| H01G 11/86 | (2013.01) | |
| H01M 4/04 | (2006.01) | |
| H01M 4/36 | (2006.01) | |
| H01G 11/58 | (2013.01) | |
| H01M 4/02 | (2006.01) | |

(52) U.S. Cl.
CPC ............ *H01M 10/30* (2013.01); *H01G 11/58* (2013.01); *H01M 2004/021* (2013.01); *Y02E 60/13* (2013.01)

(56) References Cited

U.S. PATENT DOCUMENTS

| | | | |
|---|---|---|---|
| 2008/1766740 | 7/2008 | Ma | |
| 2009/0004564 A1 | 1/2009 | Ishida | |
| 2009/0305131 A1* | 12/2009 | Kumar | H01M 4/364 |
| | | | 429/206 |
| 2010/0178543 A1* | 7/2010 | Gruner | H01G 11/68 |
| | | | 429/121 |
| 2011/0095237 A1 | 4/2011 | Liu | |
| 2012/0107582 A1 | 5/2012 | Metz | |
| 2013/0022755 A1 | 1/2013 | D'Arcy | |

* cited by examiner

NANOFIBER ELECTRODES FOR BATTERIES AND METHODS OF MAKING NANOFIBER ELECTRODES

This application is a continuation of U.S. patent application Ser. No. 15/899,408, filed Feb. 20, 2018, which is a continuation application of U.S. patent application Ser. No. 14/774,755, which issued as U.S. Pat. No. 9,911,980, filed on Sep. 11, 2015, which is a National Stage Entry of PCT Application No. PCT/US14/24468, filed on Mar. 12, 2014, which claims priority from U.S. Provisional Patent Application 61/786,833, filed on Mar. 15, 2013, all of which are hereby incorporated by reference in their entireties.

BACKGROUND

With the ever increasing use of batteries, consumers desire better performance in terms of speed of charging and discharging, as well as charge capacity from their batteries.

Carbon nanotubes (and other nanosized objects) are becoming more popular in manufacturing as supply increases. However, methods for coating carbon nanotubes have been limited to traditional coating techniques, which lead to non-uniform coating characteristics, especially when the carbon nanotubes are networked prior to coating.

SUMMARY

Provided herein is a fast fibril battery that can have both high power density, which can lead to fast charging and discharging properties, and high energy density, which can be reflected as increased capacity. Fast charging and discharging properties can be provided by utilizing conductive nanofibers and nanoscale active materials to provide electrodes with short distances between the current collector and the active materials (e.g., the nanoscale active materials). High charge capacity can be provided by utilizing high surface area supports (e.g., the nanofibers), creating networks with large and continuous porosity, in order to hold a greater quantity of active materials.

Also provided herein is an electrode, which includes a nano-scale coated network, which includes one or more first carbon nanotubes electrically connected to one or more second carbon nanotubes to form a nano-scale network, wherein at least one of the one or more second carbon nanotubes is in electrical contact with another of the one or more second carbon nanotubes. The electrode further including an active material coating that covers at least a portion of the one or more first carbon nanotubes and does not cover the one or more second carbon nanotubes to form the nano-scale coated network.

Also provided herein is a battery, which includes two electrodes; and an electrolyte, wherein at least one electrode further includes: a nano-scale coated network, which includes one or more first carbon nanotubes electrically connected to one or more second carbon nanotubes to form a nano-scale network, wherein at least one of the one or more second carbon nanotubes is in electrical contact with another of the one or more second carbon nanotubes. The battery further including an active material coating distributed to cover portions of the one or more first carbon nanotubes and portions of the one or more second carbon nanotubes, wherein a plurality of the one or more second carbon nanotubes are in electrical communication with other second carbon nanotubes under the active material coating.

Also provided herein is an electrochemical capacitor which includes a first electrode, which includes a nano-scale coated network, which further includes one or more first carbon nanotubes electrically connected to one or more second carbon nanotubes to form a nano-scale network. The electrochemical capacitor has at least one of the one or more second carbon nanotubes is in electrical contact with another of the one or more second carbon nanotubes; and an active material coating distributed to cover portions of the one or more first carbon nanotubes and portions of the one or more second carbon nanotubes. The electrochemical capacitor also having a plurality of the one or more second carbon nanotubes are in electrical communication with other second carbon nanotubes under the active material coating; a second electrode; and an electrolyte.

Also provided herein is a battery, which includes two electrodes with different electrode chemistries, wherein one of said electrodes further includes carbon nanotubes (CNTs), said CNT containing electrode having volume porosity greater than 50%. The CNT electrode of the battery further including less than 25% CNTs by weight. The battery, when discharged at ambient conditions at a 1C rate, having a cell voltage greater than 80% of the theoretical voltage, said battery having a recharge efficiency, when recharged at 2C rate, of greater than 95%.

Also provided herein is a method of forming a battery, which includes providing a first electrode, wherein forming the first electrode further includes: providing first carbon nanotubes; providing second carbon nanotubes; and coating the first carbon nanotubes with a nanoscale substance to form coated carbon nanotubes. The method further including forming a network of the coated carbon nanotubes and the second carbon nanotubes; providing a first electrolyte; and redistributing the nanoscale substance onto the network in the first electrolyte to form the first electrode. The method further including providing a second electrolyte; providing a second electrode; and providing the first and the second electrode in the second electrolyte to form a battery, wherein the first electrolyte and the second electrolyte are different electrolytes.

Also provided herein is a method of forming a battery, which includes providing a first electrode, wherein forming the first electrode further includes: providing first carbon nanotubes; providing second carbon nanotubes; and coating the first carbon nanotubes with a nanoscale substance to form coated carbon nanotubes. The method further including forming a network of the coated carbon nanotubes and the second carbon nanotubes in the first electrolyte; providing a first electrolyte; and redistributing the nanoscale substance onto the network in the first electrolyte to form the first electrode. The method further including providing a second electrolyte; providing a second electrode; and providing the first and the second electrode in the second electrolyte to form a battery, wherein the first electrolyte and the second electrolyte are different electrolytes, and the first electrolyte and the second electrolyte comprise aqueous, ionically conductive electrolytes.

Also provided herein is a method of forming a battery, which includes providing a first electrode, wherein forming the first electrode further includes: providing first carbon nanotubes; providing second carbon nanotubes; and coating the first carbon nanotubes with a nanoscale substance to form coated carbon nanotubes. The method further including forming a network of the coated carbon nanotubes and the second carbon nanotubes; providing a first electrolyte; and redistributing the nanoscale substance onto the network in the first electrolyte to form the first electrode. The method further including providing a second electrolyte; providing a second electrode; and providing the first and the second electrode in the second electrolyte to form a battery, wherein the first electrolyte and the second electrolyte are different electrolytes and the second electrolyte further includes an electrolyte with a pH level between 7 and 12.5.

Also provided herein is a method of forming an electrode, which includes providing first carbon nanotubes; providing second carbon nanotubes; and coating the first carbon nanotubes with a nanoscale substance to form coated carbon nanotubes. The method further including providing a local buffer; forming a network of the coated carbon nanotubes, the second carbon nanotubes, and the local buffer; providing an electrolyte; and redistributing the nanoscale substance onto the network in the electrolyte to form the electrode.

Also provided herein is a method of forming a battery, which includes providing a first electrode, wherein forming the first electrode further includes: providing first carbon nanotubes; providing second carbon nanotubes; and coating the first carbon nanotubes with a nanoscale substance to form coated carbon nanotubes. The method further including providing a local buffer; forming a network of the coated carbon nanotubes, the second carbon nanotubes, and the local buffer; providing a first electrolyte; and redistributing the nanoscale substance onto the network in the first electrolyte to form the first electrode. The method further including providing a second electrode; and providing the first and the second electrode in the second electrolyte to form a battery, wherein the providing the local buffer further includes providing an oxide, a hydroxide, or a carbonate in solid form.

BRIEF DESCRIPTION OF THE DRAWINGS

The accompanying drawings, which are incorporated and constitute a part of this specification, illustrate an embodiment of the invention. In the drawings.

DETAILED DESCRIPTION

Figure 1:
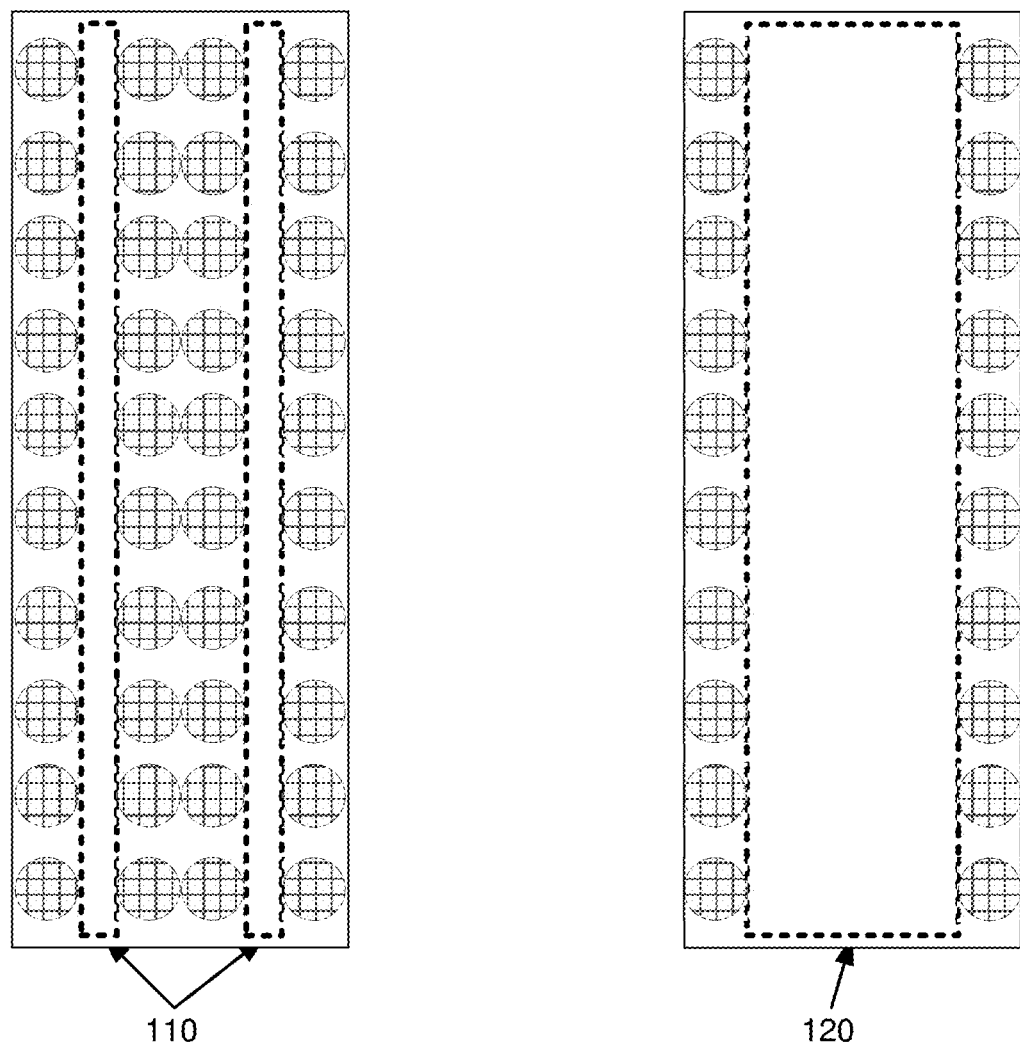
FIG. 1 is an overview illustration of a bulk volume with nanofibers and thick fibers used as support for an active material.

The following detailed description refers to the accompanying drawings. The same reference numbers in different drawings may identify the same or similar elements. Also, the following detailed description describes embodiments of the invention and is not intended to limit the invention. Instead, the scope of the invention is defined by the appended claims and equivalents.

A. OVERVIEW

As described herein, a fast fibril battery with fast charging and discharging properties and high charge capacity can be provided by using smaller scale supports and active materials than traditional batteries. By providing smaller scale supports and active materials, electron transport distances between supports and active materials can be made shorter and thus provide a higher rate of charge and discharge. Currently, support structures, such as grids, are used to hold active materials to form electrodes for batteries. The surfaces of the grid are coated with a layer of active material; the layer is usually made of smaller particles. The electrons from the grid travel through the layer of the active material, which is usually much less conductive than the grid, to reach the actual place of the electrochemical reaction on the border between the active material particle and the electrolyte. The resistance of the active material layer is the limiting factor in the speed and power characteristics of a battery. To reduce the resistance of the active layer, conductive materials are usually added to the layer, such as carbon black, carbon fibers and nanofibers, and other types of conductive additives.

Another way to reduce the resistance of the active material layer is to reduce the thickness of the active material layer. When the thickness of the active material layer is reduced on a given grid, the overall amount of the active material will be reduced too, which will result in a lower capacity of the battery. In order to maintain the same capacity with the reduced thickness of the active material layer, the surface area of the grid may be increased by using, for example, a nanoscale grid.

Additionally, current batteries tend to trade high speed (i.e., fast charging and discharging properties) and high capacity for size (i.e., larger batteries for higher capacities) or flammability (i.e., more volatile battery chemistries). With the concern for weight and safety as a trade-off for speed and capacity, most battery designers are forced to make undesirable decisions that lead to compromises that can be unacceptable (e.g., explosiveness or flammability in high speed, high capacity, lightweight batteries, or safety with lower speed, lower capacity, and/or heavier weighted batteries).

Provided herein are electrodes that can provide high speed, high capacity, lightness, and safety in batteries. These electrodes can utilize properties of nanofibers and nanoscale active materials, in conjunction with a current collector, to increase the speed and capacity without additional weight and/or additional safety concerns.

As used herein, the term current collector can include metal or other conductive materials (e.g., carbon) and can be mesh, foil, plate, grid, etc. in structure. Additionally, the current collector is electrically connected to the load. Further information about current collectors can be found in, for example, "Handbook of Batteries and Fuel Cells," ed. David Linden, McGraw Hill Inc., 1984, which is incorporated in its entirety by reference.

Increased speed can be implemented by providing a fast fibril battery that utilizes nanofibers and nanoscale active materials. By providing electrodes with nanoscale active materials located on nanofibers to allow for short electrical pathways between the nanoscale active materials and a current collector (e.g., the nanoscale support material)) fast charging and discharging properties can be achieved. While not wishing to be bound by theory, it is believed that the thickness of the active material, which is poorly conductive, controls the rate of both charging and discharging reactions. By providing a thin layer of active material (i.e., nanoscale active material on conductive nanoscale fibers), this limitation can be controlled and the distance that an electron must travel through the active material (and thus, the time to travel this distance) can be reduced. A fast fibril battery can also have a higher capacity than other high power density batteries, such as thin film batteries, because the high porosity of the nanoscale conductive support (i.e., the nanofibers) can allow a substantial volume of the battery to be active material.

FIG. 1 depicts a bulk volume with nanofibers 110 and thicker fibers 120 used as supports for an active material. As illustrated in FIG. 1, thin layers of active material on nanofibers 110 provide more capacity than thin layers of active material on thicker fibers 120 in the same bulk volume.

Batteries include electrodes in an electrolyte. The electrodes include an anode and a cathode. During discharge, the chemical compounds, or "active material," in an anode undergoes an oxidation reaction to release one or more electrons, while the active material in a cathode undergoes a reduction reaction to combine free electrons with ions. The type of active material can be selected based upon the half-cell potential of two electrode chemistries. For example, electrodes may be selected based on potentials that differ from each other as much as possible (i.e., one electrode may have a positive potential, and the other electrode may have a negative potential vs. a standard hydrogen electrode (SHE)). For example, a battery may contain two electrodes with a potential difference between 0.5V and 3V. The anode and cathode work together to provide electrical energy via their chemical reactions.

The capacity of a battery depends upon the electrodes' energy density (i.e., the amount of energy that the active material in each electrode can hold), as well as engineering factors, such as the weight of the packaging, weight of current collectors and membranes, etc., and the speed or power density of the battery depends upon the rate at which energy producing chemical reactions can be conducted (i.e., the speed that electrical energy can be provided by the active material in each electrode).

The energy density can be determined by the types of active material and the amount of active material. For this reason, particular types of active material (i.e., chemical compounds) are superior based on the particular application. For example, lithium-ion batteries can be used for lightweight, high-performance applications, such as mobile devices and computers as they have a desirable energy density for these high-performance applications. Other batteries, such as lead-acid, have lower energy densities, so cannot be used to power lightweight, high-performance applications due to their higher weight. On the other hand, for lower cost, high reliability, lower energy density requirement applications, such as automotive SLI (starting, lighting, ignition) batteries, the lower cost and acceptable weight can make lead-acid batteries more desirable than lithium-ion batteries.

Increasing the energy density of a battery can be accomplished by providing more active material for a given space. In one implementation, less volume can be allocated to a support and more volume can be allocated to active material by using smaller support structures, such as nanofibers or preferably, networks of nanofibers. Similarly, eliminating the current collector by using a conductive support can also increase the energy density of a battery.

As described in U.S. Pat. No. 6,205,016 and its divisional patent U.S. Pat. Nos. 6,491,789, 6,031,711, and 6,099,960, all of which are explicitly incorporated by reference, nanofibers can be used in electrochemical capacitors (ECs). ECs generally have much lower energy density than batteries. They store energy in an electric field between usually porous electrodes separated by an ionically conductive electrolyte. Thus electrochemical capacitors can store energy essentially only as surface charge while, batteries, on the other hand, store energy corresponding to a chemical reaction in a cell, and discharge energy based on a chemical reaction associated with passage of a certain number of electrons or faradays per mole of reactants.

Increasing the energy density of the active material can also be accomplished by distributing the active material throughout the conductive support network. In one implementation, increasing the energy density of active material can be done by coating a conductive support system with active material. For example, as illustrated in FIG. 2, a fast fibril electrode can be provided in one embodiment by example method 200.

B. METHOD OF MAKING AN ELECTRODE

Figure 2:
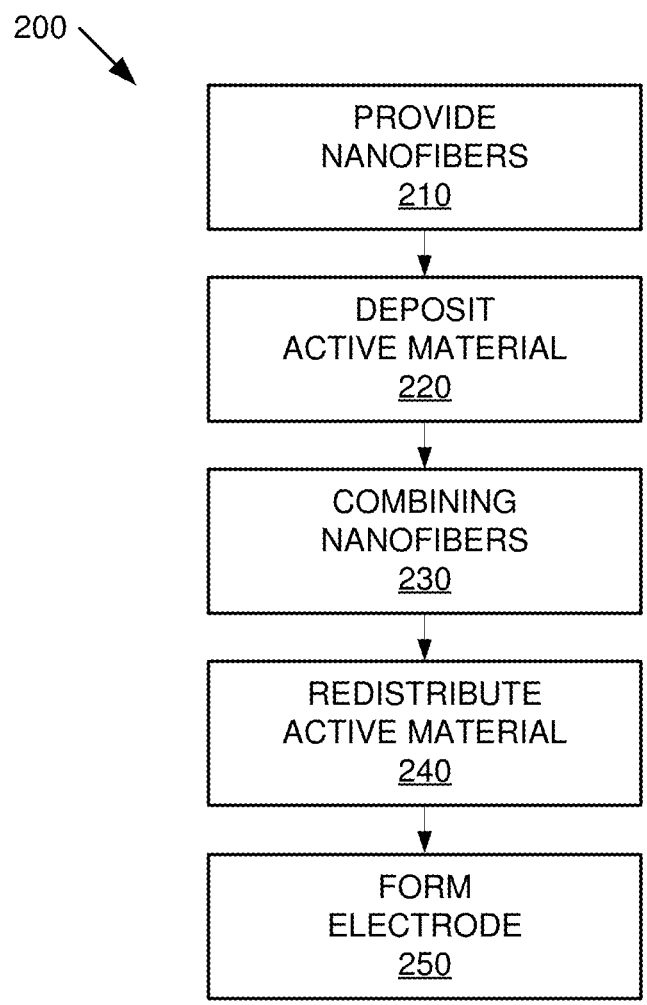
FIG. 2 is an overview illustration of an example method by which an electrode may be formed.

FIG. 2 illustrates an example method 200 by which an electrode may be formed. FIGS. 3A-3F are example illustrations for forming an electrode by method 200 of FIG. 2. FIG. 3G is an example illustration for forming a battery using the electrode from method 200 of FIG. 2.

Method 200 can include providing nanofibers in step 210. In one implementation, the nanofibers can be provided in a liquid medium or in another media, such as air.

Figure 3A:
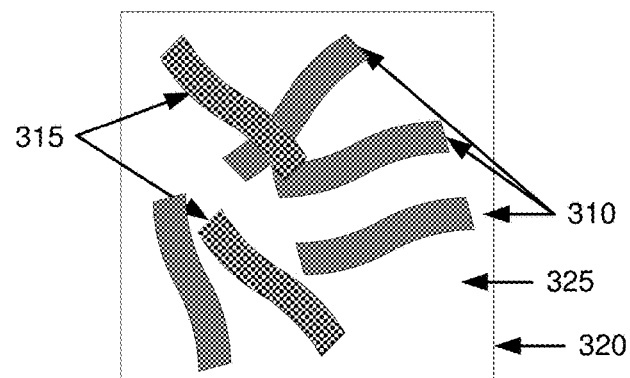
FIGS. 3A-3F are example illustrations for forming an electrode by the example method of FIG. 2.

For example, as illustrated in FIG. 3A, first nanofibers 310 and second nanofibers 315 can be provided in a first vessel 320. Nanofibers 310, 315 may be the same or different sized (i.e., diameter, length/diameter ratio, agglomeration size, etc.) nanofibers and may be formed of the same or different types of materials within nanofibers 310 and nanofibers 315, respectively, or between nanofibers 310 and nanofibers 315. For example, nanofibers 310 and nanofibers 315 may be single wall or multi-wall nanotubes, and may further include solid nanoscale fibers, fishbone nanoscale fibers, etc. In one embodiment, one or more nanofibers in nanofibers 315 may include the same or different nanofibers (and microfibers and/or macrofibers) compared to one or more nanofibers in nanofibers 310 or compared to one or more nanofibers in other nanofibers 315.

Additionally, nanofibers 310, 315 may be produced in the same or different batches, which may also yield variations in size, shape, or structure. In one embodiment, nanofibers 310 and nanofibers 315 are similar within each group of nanofibers 310 and nanofibers 315, respectively. In one embodiment, nanofibers 310 and nanofibers 315 may be similar in size and shape throughout nanofibers 310 and nanofibers 315. The various shapes, sizes, and structures for nanofibers 310, 315 are further discussed below.

Nanofibers 310, 315 may be provided in liquid medium 325 that can allow nanofibers 310, 315 to self-assemble (i.e., aggregate or agglomerate) or remain independent (i.e., maintain a certain spacing distance) from other nanofibers 310, 315. In one embodiment, liquid medium 325 can include a liquid vehicle, such as an aqueous solution or an electrolyte. For example, liquid medium 325 may be water. Further discussion on networking of nanofibers may be found in U.S. Pat. Nos. 6,099,965, 7,923,403, and U.S. Patent Application Publication No. 2008/0176052 A1, which are incorporated herein in their entireties.

Figure 4:
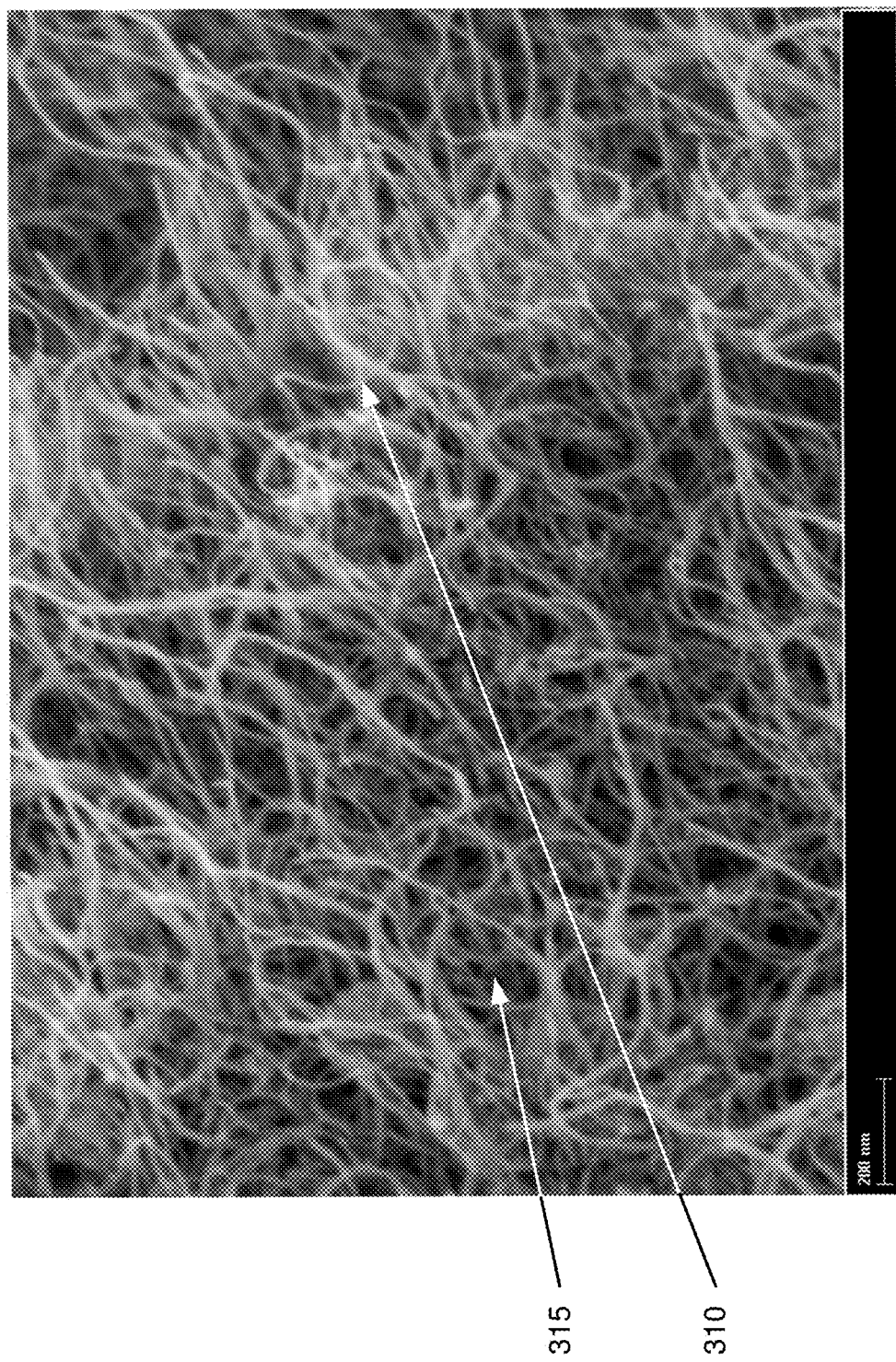
FIG. 4 is a Scanning Electron Microscope (SEM) image of a network of nanofibers.

FIG. 4 is a Scanning Electron Microscope (SEM) image of a network of nanofibers. As illustrated in FIG. 4, nanofibers 310, 315 may be networked or entangled to form one or more aggregations. Further discussion of nanofibers 310, 315 follows below.

Method 200 can also include depositing an active material on first nanofibers 310 to form coated nanofibers in step 220. The active material, as discussed further below, may be any material capable of providing an acceptable energy density and potential for a battery electrode, such as an electrochemically active nanoscale solid substance, as further discussed below. In one implementation, deposition of the active material may occur by separating first nanofibers 310 from second nanofibers 315, such that only first nanofibers 310 (or second nanofibers 315) may be subjected to the deposition of the active material to form coated nanofibers, while second nanofibers 315 may remain non-coated nanofibers. While the active material is deposited on first nanofibers 310 to coat nanofibers in step 220, other materials, such as nanoscale substances may also be deposited on first nanofibers 310. For example, local buffers or other nanoscale substances may also be deposited, as further discussed below.

Figure 3B:
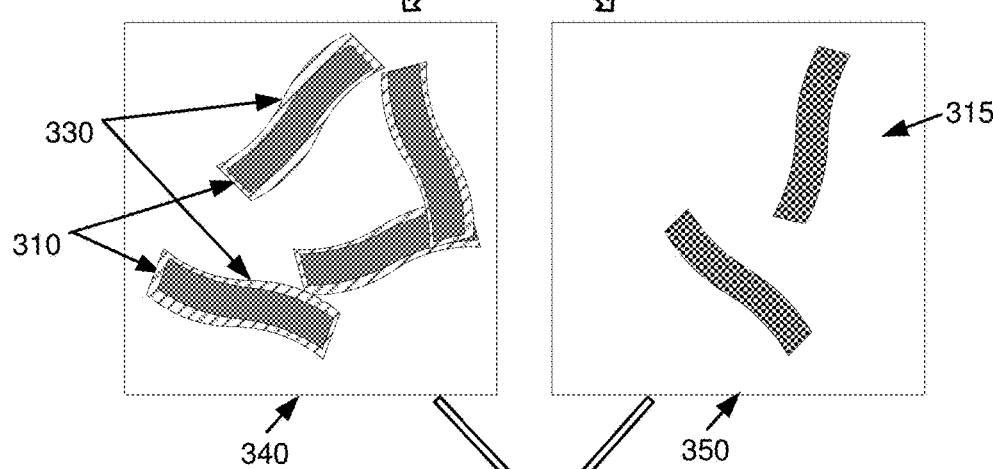

For example, as illustrated in FIG. 3B, first nanofibers 310 can be placed in second vessel 340, while second nanofibers 315 can be placed in third vessel 350. Active material 330 may be deposited on first nanofibers 310 in second vessel 340, while nanofibers 315 in third vessel 350 may remain free of active material 330. Deposition of active material 330 can be done by any method that allows active material 330 to adhere to a surface of nanofibers 310. For example, deposition can occur in a liquid phase by chemical or electrochemical deposition. As another example, deposition can occur in a gas phase by chemical vapor deposition or physical vapor deposition. In one implementation, active material 330 may include an electrochemically active nanoscale solid substance, such as one or more of hydroxides, carbonates, fluorides, sulfates, oxalates, phosphates of one or more compounds, such as Ni, Zn, Cd, Fe, Pb, Mn, Co, Ag, Al, or Mg.

In another implementation, deposition of the active material may occur together with providing a local buffer. A local buffer can include an additive that would moderate the pH of the neutral electrolyte (i.e., "neutral" being a pH between 7 and 12.5, preferably between 9 and 11.5 for the active materials 330 discussed herein), which may be provided for the operation of the battery.

Method 200 can also include combining first nanofibers 310 coated with active material 330 (from step 210 or the like) and second nanofibers 315, which are not yet coated, in step 230. In one implementation, first nanofibers 310 with active material 330 coating and second nanofibers 315 may be combined by physically mixing them together in a liquid vehicle. For example, they can be mixed by any means, such as by using a mixer, an agitator, a sonicator, or an ultrasonicator. In another implementation, they can be mixed in a dry state by any means, such as a mixer, a blender, or a mill, where the mill can mix them by milling the active materials and the nanofibers together in any kind of high intensity device, including, but not limited to a ball mill or rod mill, colloid mill or microfluidizer in a continuous or a batch operation.

Figure 3C:
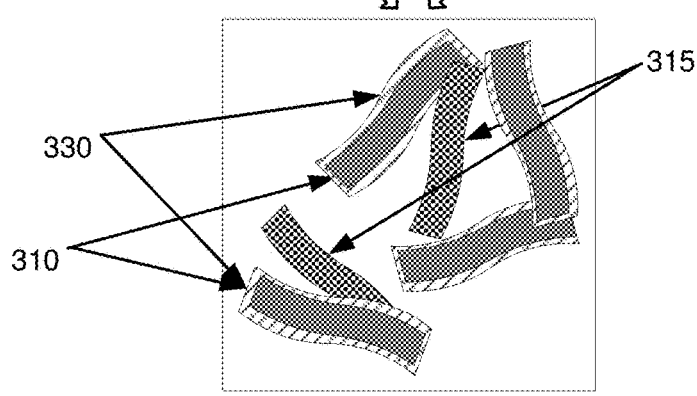

For example, as illustrated in FIG. 3C, nanofibers 310 with coating 330 from second vessel 340 may be combined with non-coated nanofibers 315 from third vessel 350.

Figure 3D:
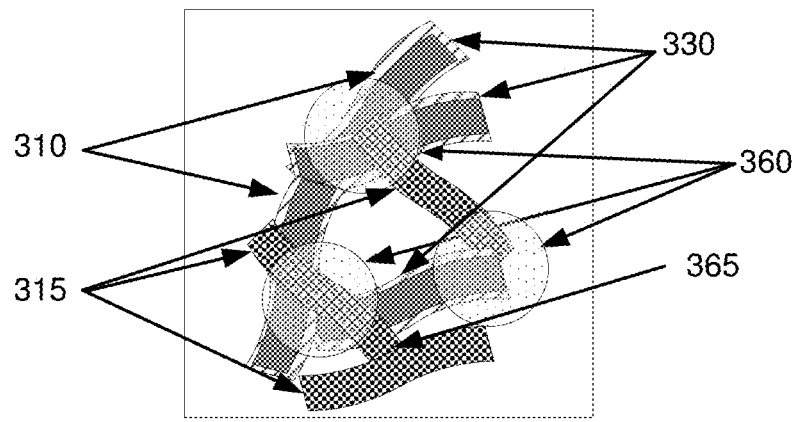

In one example, as illustrated in FIG. 3D, first nanofibers 310 with coating 330 and second nanofibers 315 (without coating 330) can be networked together to form an electrically conductive network of nanofibers with electrical communication areas 360 and electrical contacts 365. By combining first nanofibers 310 with active material 330 and second nanofibers 315, electrical conductivity between first nanofibers 310 and second nanofibers 315 can be provided within electrical communication areas 360, and between second nanofibers 315 and another second nanofiber 315 within electrical contacts 365. It is noted that the electrical contacts 365 between second nanofibers 315 will not be hindered by active material 330. Also, because of a plurality of these electrical contacts 365, the overall network can be very conductive.

Figure 5:
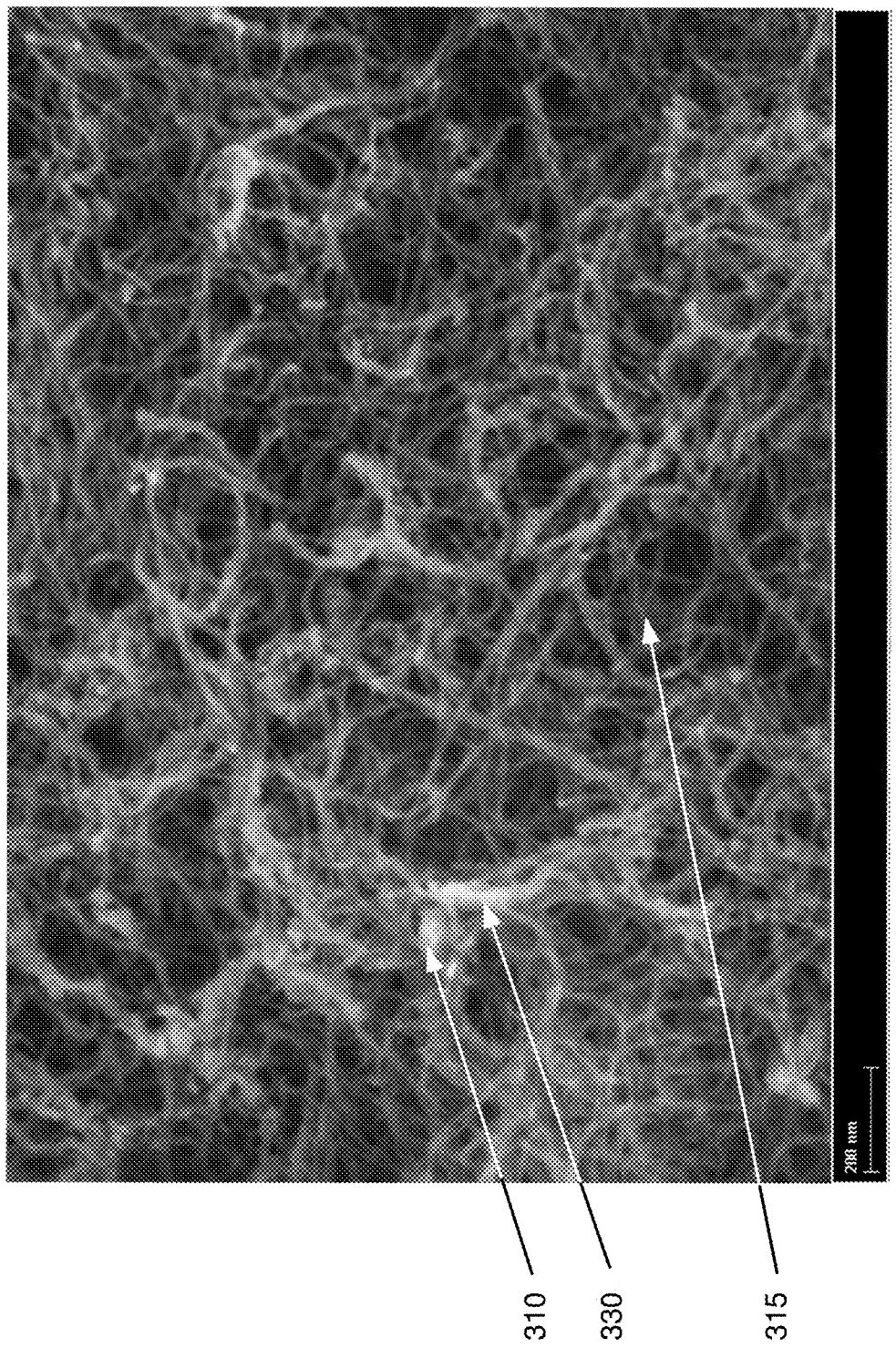
FIG. 5 is an SEM image of nanofibers including active material thereon prior to redistribution of the active material within the nanofibers.

For example, as illustrated in FIG. 5, which is an SEM image of nanofibers including active material thereon prior to redistribution of the active material within the nanofibers, a network of first nanofibers 310 with active material 330 (i.e., nanofibers 310 with active material 330 located on the surface) and second nanofibers 315 (i.e., nanofibers without active material 330) may be provided. As shown in FIG. 5, active material 330 may be present on first nanofibers 310 and not present on second nanofibers 315 (and not present between second nanofibers 315 within electrical contacts 365).

Method 200 can include redistributing active material 330 throughout the network in step 240. In one implementation, redistribution of active material 330 can be provided by recrystallizing active material 330 from active material 330 on the surface of first nanofibers 310 to the surface of second nanofibers 315. In another implementation, redistribution of active material 330 may be provided via electrical charge and discharge.

Figure 3E:
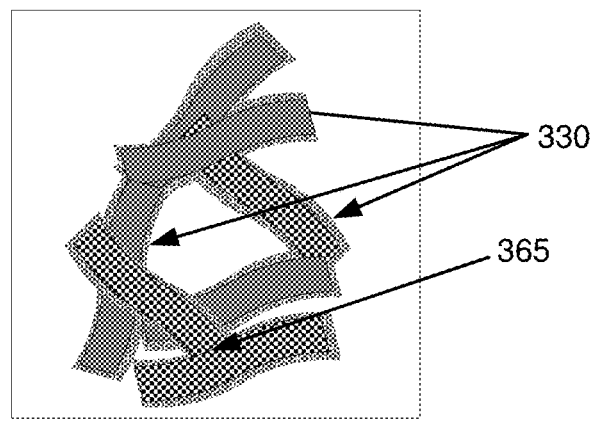

For example, as illustrated in FIG. 3E, active material 330 from coated first nanofibers 310 can be redistributed onto a portion of the previously non-coated second nanofibers 315 to redistribute active material 330. Advantageously, in one implementation, active material 330 from coated first nanofibers 310 can provide coverage of the surface of coated first nanofibers 310 and coverage of the surface of the previously non-coated second nanofiber 315 such that electrolytes that may be brought into contact with coated first nanofibers 310 and the previously non-coated second nanofiber 315 would not contact either of the underlying nanofibers 310, 315. As mentioned above, non-coated second nanofibers 315 can maintain non-coated electrical contacts 365 where active material 330 is not between second nanofibers 315.

By providing active material 330 directly on nanofibers 310, 315, electrical conduction paths between nanofibers 310, 315 and active material 330 can be reduced in length, thus leading to increased electrical conduction speed through a resulting electrode.

Figure 6:
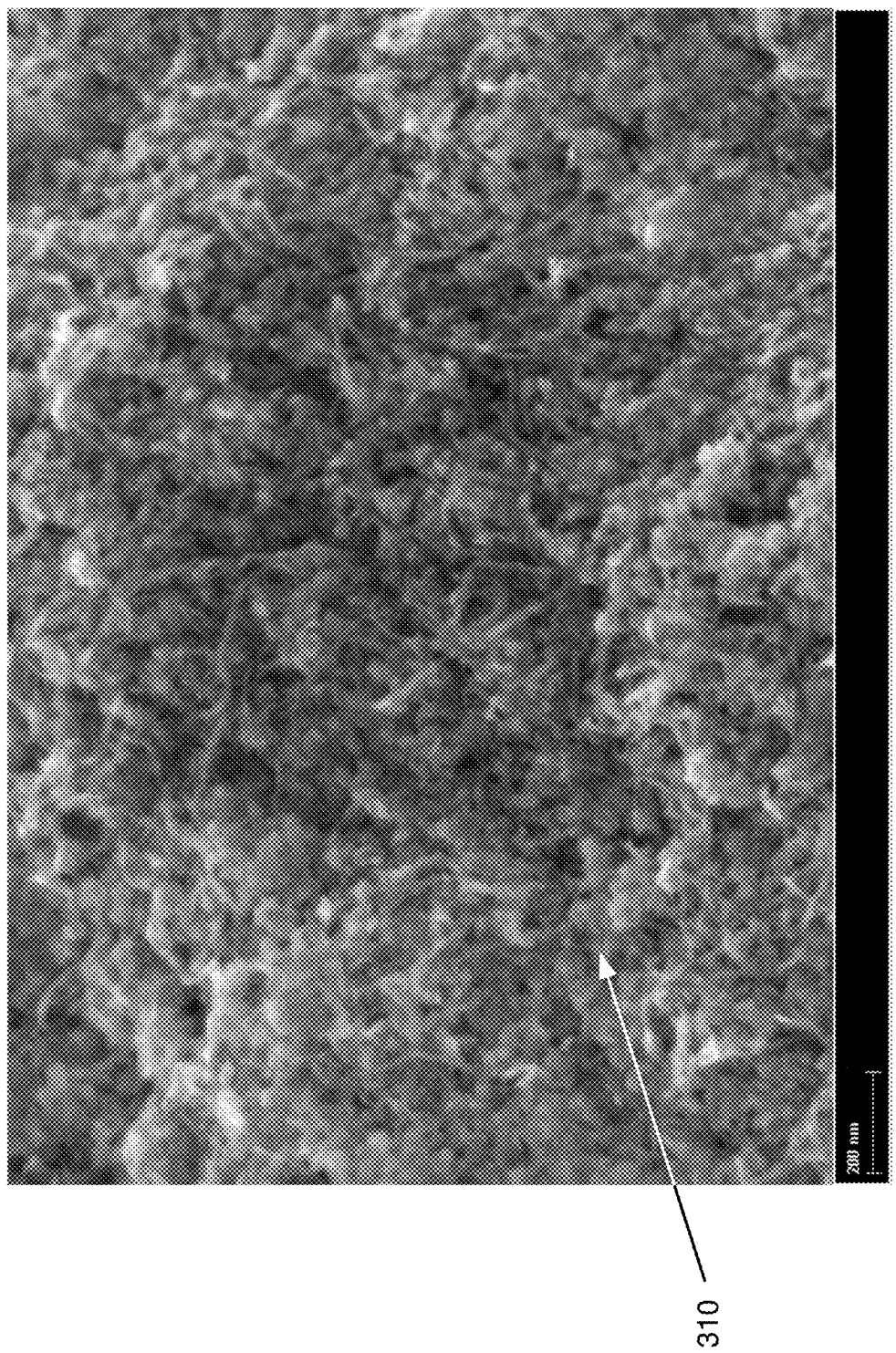
FIG. 6 is an SEM image of nanofibers including active material thereon after redistribution of the active material within the nanofibers.

In one implementation, as illustrated in FIG. 6, which is an SEM image of nanofibers including active material thereon after redistribution of the active material within the nanofibers, the coating from coated nanofibers 310 can move to cover large areas of nanofibers 310, 315 with deposits by distributing active material 330 from first coated nanofibers 310 and to previously non-coated second nanofibers 315.

Figure 7:
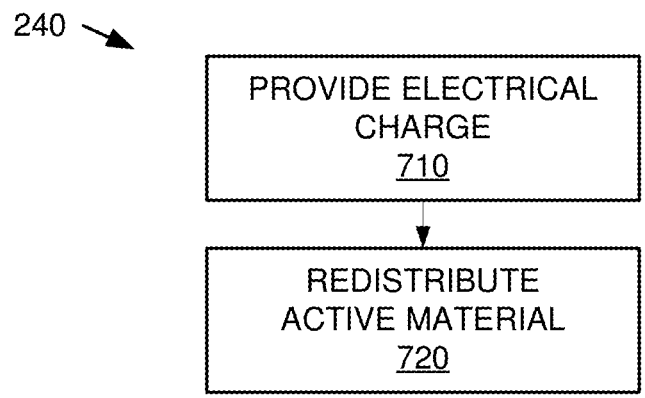
FIG. 7 is an example flowchart of a step of the example method of FIG. 2.
Figure 8A:
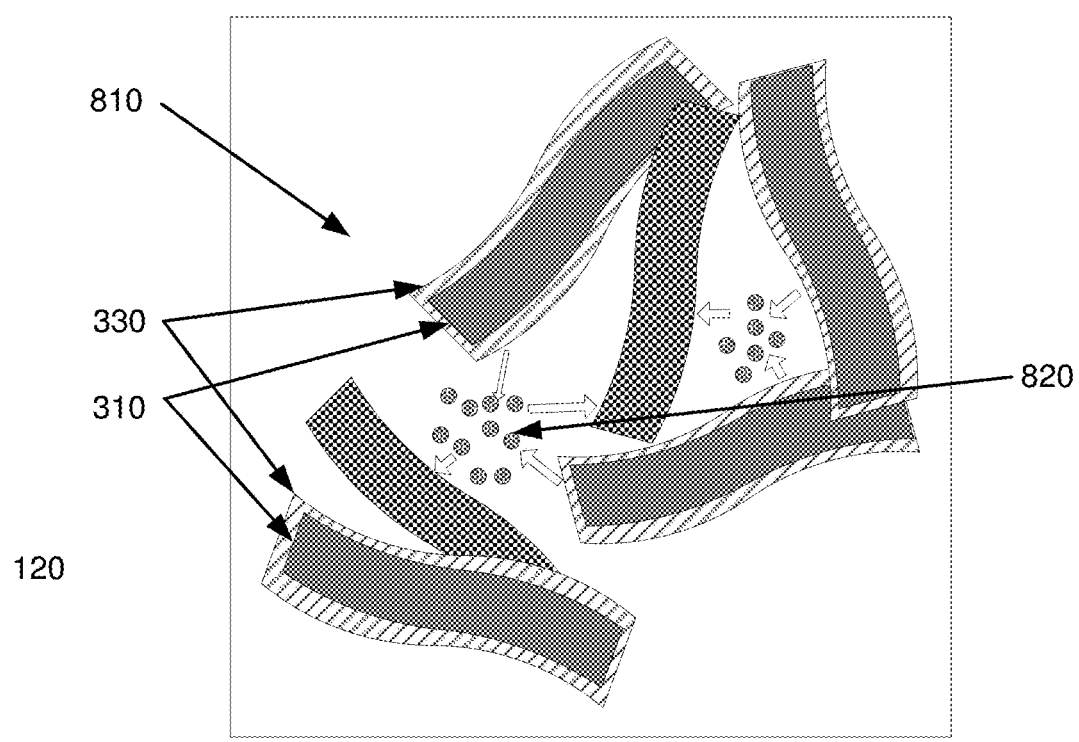
FIGS. 8A-8B are example illustrations of nanofibers and active material when the active material is redistributed among the nanofibers.

One implementation is illustrated in FIG. 7, which is an example flowchart of step 240 of method 200 of FIG. 2, and in FIG. 8A, which is an example illustration of nanofibers 310, 315 and active material 330 when active material 330 is redistributed among the nanofibers 310, 315. In FIGS. 7 and 8A, redistributing active material 330 can occur by providing an electrical charge to nanofiber network 810, which includes first (i.e., coated) nanofibers 310 and second (i.e., non-coated) nanofibers 315, in sub-step 710 of step 240. By providing an electrical charge, some of active material 330 can be released from first nanofibers 310 as released active material 820. Released active material 820 can be released into areas among coated first nanofibers 310 and non-coated second nanofibers 315.

Redistribution of released active material 820 from first nanofibers 310 to second nanofibers 315 can occur in sub-step 820. It is believed that released active material 820 will deposit onto the most electrochemically active areas of second nanofibers 315, which should be the non-coated surfaces of second nanofibers 315. It is also believed that while the non-coated areas of second nanofibers 315 are coated with released active material 820, the newly coated areas will become less electrochemically active and less attractive to released active material 820 compared to non-coated areas of second nanofibers 315. Eventually, the non-coated areas of second nanofibers 315 can become coated and the electrochemical activity of first nanofibers 310 and second nanofibers 315 should reach equilibrium from the redistribution of released active material 820.

Alternatively, other mechanisms can be used to release active material 330 from coated first nanofibers 310, as released active material 820 for deposition on second nanofibers 315. For example, the network of coated nanofibers 310 with active material 330 and uncoated nanofibers 315 can be subjected to repeated heating and cooling cycles in a liquid vehicle. Active material 330 can be partially released as released active material 820 during a heating cycle and re-deposited in different locations during the cooling cycle.

Figure 8B:
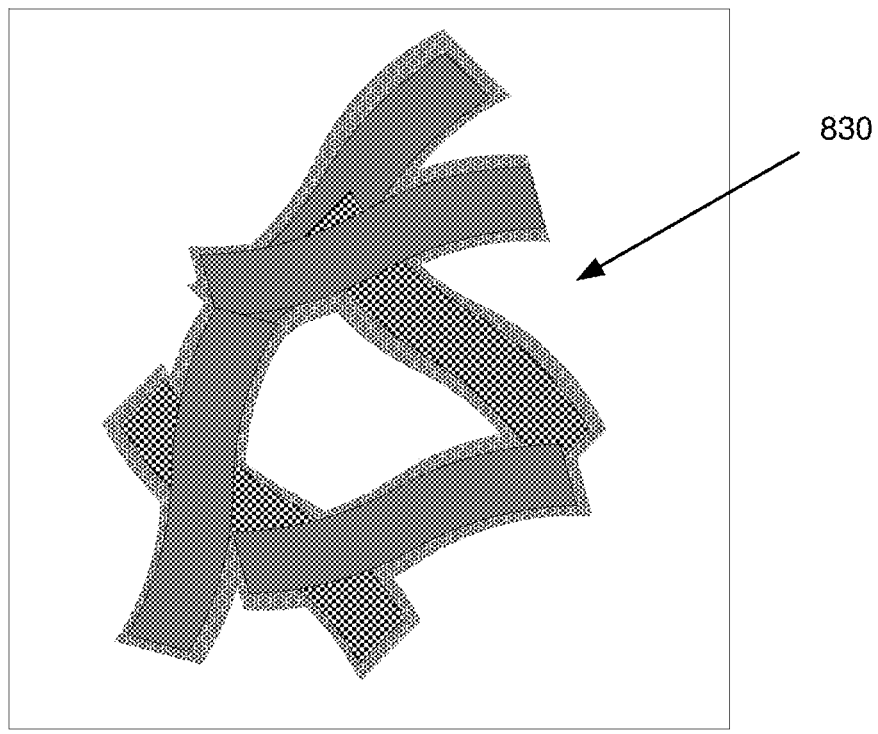

Next, as illustrated in FIG. 8B, which is an example illustration of nanofibers 310, 315 and active material 330 when active material 330 is redistributed among nanofibers 310, 315, nanofiber network 810, which can be an agglomeration or aggregation of first nanofibers 310 and second nanofibers 315, can be made accessible to released active material 820. A coated nanofiber network 830 may be formed by allowing released active material 820 to attach to non-coated second nanofibers 315 (and coated first nanofibers 310) to form coated nanofiber network 830 via redistribution. In one implementation, several redistributions of active material 330 via various redistribution mechanisms may occur to allow released active material 820 to coat previously non-coated second nanofibers 315. One example of a redistribution mechanism may be recrystallization.

By redistributing active material 330 to form coated nanofiber network 830, electrical communication between second nanofibers 315 can be established within coated nanofiber network 830. This can occur before second nanofibers 315 are coated to allow electrical communication between second nanofibers 315 to be preserved. By preserving the electrical communication, electrical conductivity between second nanofibers 315 can be uninterrupted by active material 330, yet active material 330 coverage throughout coated nanofiber network 830 can be optimized.

While not wishing to be bound by theory, it is believed that coating first nanofibers 310 and second nanofibers 315 prior to networking may cause active material 330 to insulate junctions between nanofibers 310, 315 and may prevent the nanofibers from having electrical communication with one another. As such, the network formation step is preferably before the coating or at least before the completion of the coating step (e.g., before redistribution is complete).

Figure 9:
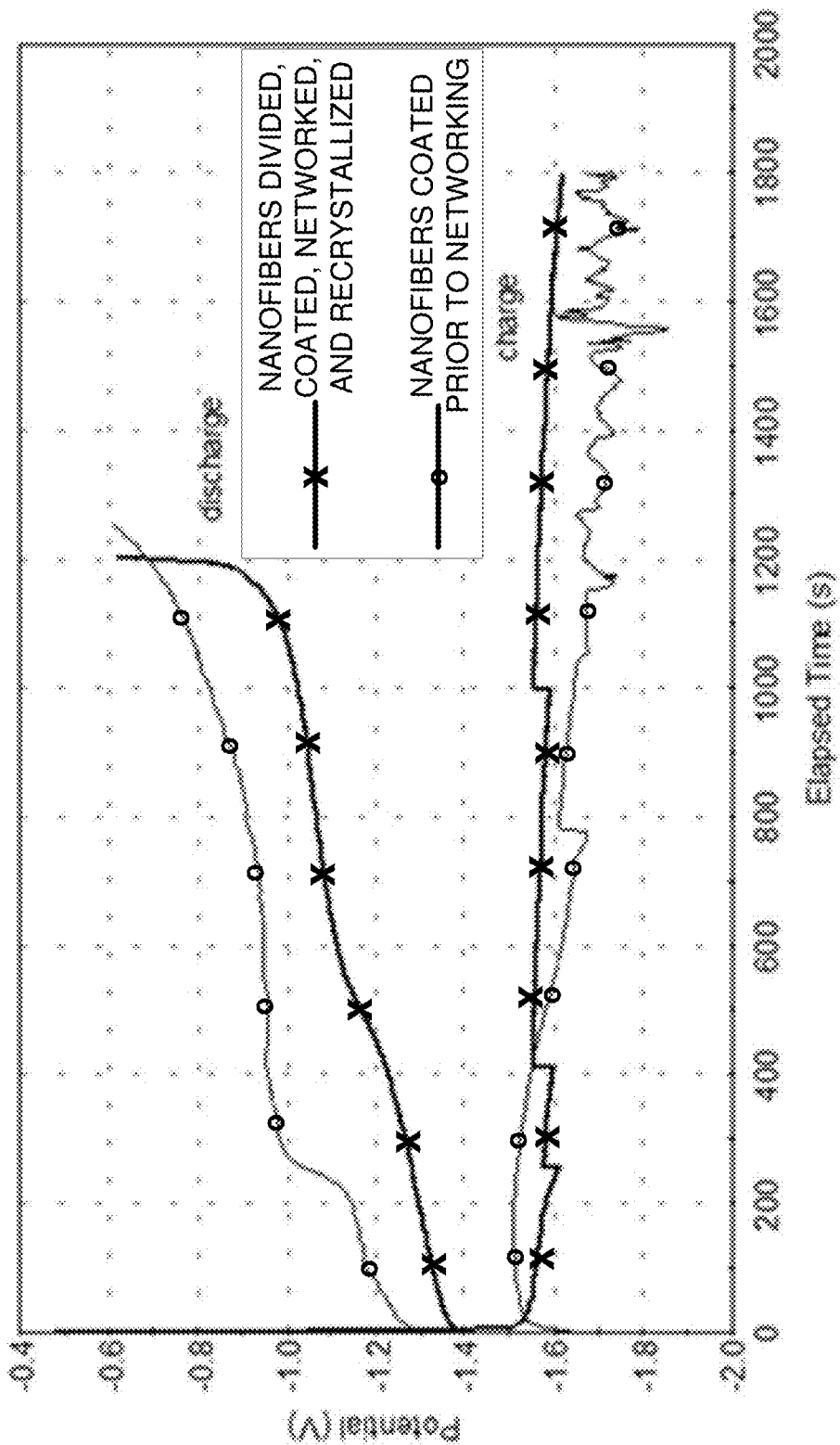
FIG. 9 is an example graphical illustration of charge-discharge results for an example nanofiber-nanoscale active material electrode before and after redistribution of the active material.

FIG. 9 is an example graphical illustration of charge-discharge results for an example nanofiber-nanoscale active material electrode before and after redistribution of active material 330. As illustrated in FIG. 9, nanofibers which are divided, coated, networked, and redistributed show superior charge and discharge properties compared to nanofibers which are coated prior to networking. In FIG. 9, two similar samples, a first sample with nanofibers coated with $ZnCO_3$, a second sample with ⅔ of the nanofibers coated with $ZnCO_3$, mixed with ⅓ non-coated nanofibers. Both samples were charged and discharged at 2C rate (the currents, at which the battery is expected to be charged and discharged in ½ hour). FIG. 9 shows a cycle in 30% $K_2CO_3$ saturated with ZnO electrolyte. One can see that the charge curve is noisy for the first sample, pointing to poor electrical contacts. The second sample, on the other hand, is smooth. This result, in addition to the higher potentials on the discharge curve of the second sample, appears to indicate that the second sample has better electrical contacts (lower internal resistance).

Method 200 can include forming an electrode from coated nanofiber network 830 in step 250. In one implementation, coated nanofiber network 830 can be wetted with an electrolyte. Next, wetted coated nanofiber network 830 can be made into a paste, and the paste can be formed into an electrode. For example, the paste may be pressed onto a current collector, such as a conductive film, current collector plate, etc. In another implementation, coated nanofiber network 830 can be its own current collector.

Figure 3F:
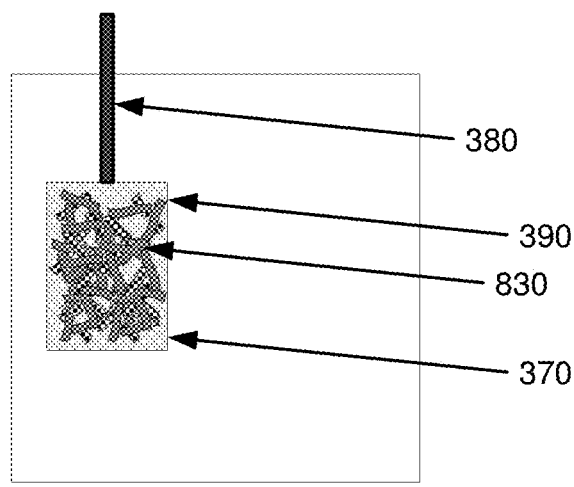
Figure 3G:
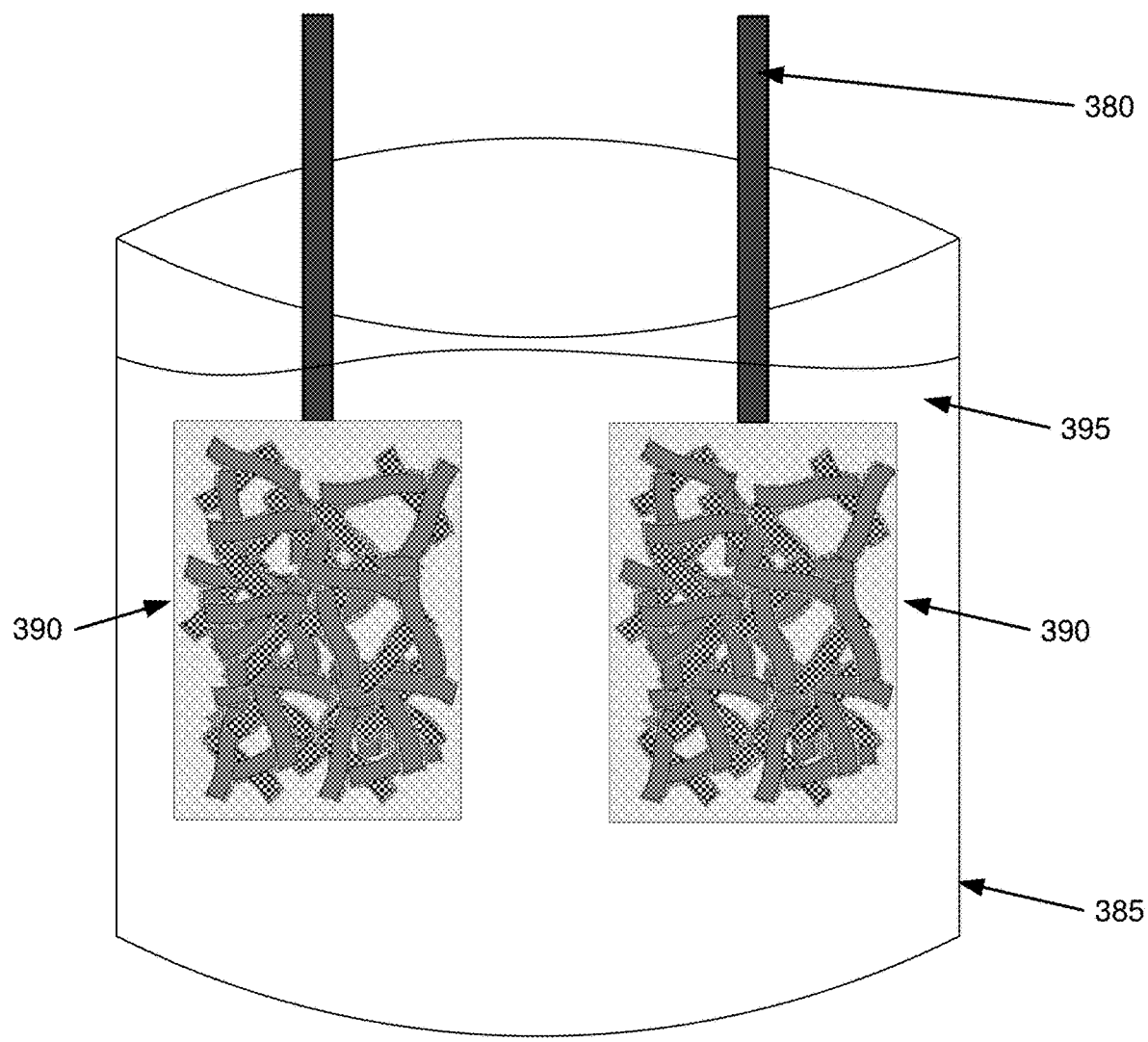
FIG. 3G is an example illustration for forming a battery using the electrode from the example method of FIG. 2.

Additionally, as illustrated in FIG. 3F, a paste of coated nanofiber network 830 (or other coated nanofiber network) can be provided on a current collector plate 370 and a lead 380 can be attached to form an electrode 390. In one implementation, coated nanofiber network 830 may be wetted with the same or different electrolyte as the electrolyte used in networking first nanofibers 310 and second nanofibers 315 in step 240. Additionally, step 240 and step 250 may be done in any order, such as forming the electrode in step 250, then redistributing the active material in step 240; redistributing the active material in step 240, then forming the electrode in step 250; concurrently forming the electrode and redistributing the active material in steps 240 and 250; or may include additional intervening steps. A first and a second electrolyte, or a single electrolyte may be used in steps 240 and 250.

Method 200 can include repeating steps 210 to 250 to provide additional electrodes. In one implementation, steps 210 to 250 can be done to form an anode, then using a different active material, can be repeated to form a cathode.

FIG. 3G is an example illustration for forming a battery using the electrode from method 200 of FIG. 2. For example, as illustrated in FIG. 3G, two electrodes 390 with leads 380 can be placed in a vessel 385 with electrolyte 395 to form a battery.

C. ELECTROLYTE SELECTION

One way of increasing the charging/discharging speed of batteries is to utilize a fast electrolyte. Aqueous electrolytes can be safe and fast, but can have limited usefulness as water decomposes at about one volt. Non-aqueous electrolytes can tolerate higher voltages, but are usually less conductive (i.e. slower) than aqueous electrolytes as well as having safety issues, such as flammability and explosiveness. In one embodiment, the electrolyte may include an aqueous, ionically conductive electrolyte.

An electrolyte can be selected based upon compatibility with the electrodes selected. Many battery chemistries, especially those with metal anodes, also suffer from slow dissolution of active materials into the electrolyte and/or slow self-discharge by undesirable side reactions. Although methods to mitigate these are known, the degree of the problem is basically proportional to the surface area of the active material. Inasmuch as nanofiber electrodes have much higher surface area than most battery electrodes, many known methods prove impracticable for nanofiber based electrodes. For example, the quantity of additive, mitigant, etc. can exceed the solubility or become otherwise impractical for use.

In one implementation, electrolytes may contain a carbonate, a hydroxide, a phosphate, a fluoride, and/or a sulfate. For example, KOH, NaOH, $K_2CO_3$, $K_2SO_4$, KF, NaF, $Na_2CO_3$, $K_3PO_4$, and/or $H_2SO_4$ may be contained in electrolytes herein.

In one implementation, a pH adjustment using a more nearly neutral electrolyte may provide a solution. As used herein, a "neutral" electrolyte can include an electrolyte with a pH level between 7 and 12.5. For example, an electrolyte with a bulk (i.e., overall) pH level of 9 to 11.5 is preferred to mitigate undesirable side reactions in combination with the electrode chemistries and electrolytes discussed herein.

In one implementation, a local buffer may be added to the electrode to provide localized pH adjustment. By providing a local buffer, caustic electrolytes (i.e., electrolytes with pH levels higher than 14), which can cause problems with anodes, such as the slow dissolution of active materials, can be avoided; and electrochemical results similar to electrodes with caustic electrolytes can be achieved using more nearly neutral electrolytes with a local buffer. Adding local buffer can allow for localized regions within the electrode-electrolyte system to have a localized pH higher than 11, and thus have similar results to caustic electrolyte electrodes from neutral electrolyte electrodes.

The local buffer may be provided in solid, nanoscale form. By providing a local buffer in solid form, the solid local buffer may be provided in localized regions of the system in amounts exceeding the bulk solubility of the local buffer in the electrolyte. Additionally, the local buffer may be provided in the form of nanoscale particles, which may be distributed throughout the nanoscale coated network more easily than larger particles, thus allowing the local buffer to be readily available for the reactions of pH adjustment, while not being dissolved in the electrolyte. Preferably, by providing a local buffer, ions may be available for providing hydroxide ions in a local region to raise a local pH in an overall lower pH bulk. In one implementation, an oxide, a hydroxide, or a carbonate in solid form can be provided as a local buffer. One example local buffer is $Mg(OH)_2$, which can readily provide hydroxide ions, while not being dissolved by certain electrolytes. Another example local buffer is $Ca(OH)_2$, which can also readily provide hydroxide ions, while not being dissolved by certain electrolytes.

The local buffer may be provided by depositing the local buffer solid additive nanofibers before, after, or during the deposition of active material on the nanofibers. For example, the local buffer can be deposited on a surface of the nanofibers, on a surface of the active material, or co-deposited with the active material.

In one implementation, in a neutral electrolyte with a bulk pH around 11, a local buffer may be added to or deposited on: (1) coated first nanofibers 310 (before or after depositing active material 330); (2) second nanofibers 315; (3) both coated first nanofibers 310 and second nanofibers 315; and/or (4) to a system with first nanofibers 310 and second nanofibers 315 in step 230 to form a network.

Aqueous electrolytes, as mentioned above, can suffer from undesirable side reactions causing gas evolution. Exposed surface of the conductive support network may catalyze hydrogen evolution or oxygen evolution from water at more or less the same voltages needed to cause the desired half-cell reactions. Thus, surfaces of the conductive support network may be desirably electrochemically insulated by covering with active material to reduce gas evolution and increase charge-discharge efficiency.

Depositing additional active material may not achieve coverage of the conductive support network to reduce or prevent gas evolution. In one embodiment herein, active material 330 may be provided such that active material 330 electrochemically isolates first nanofibers 310 and second nanofibers 315, preferably when networked as coated nanofiber network 830, from electrolytes. It is believed that depositing more active material 330 may not achieve complete coverage. Crystallization or deposition from solution would preferentially deposit active material 330 on active material 330 that is already there rather than improving coverage of the remaining bare surfaces of nanofibers 310, 315. The energy of crystal formation on the same material is usually lower than nucleation on a different material, thus the already deposited active material 330 can serve as a more preferable substrate for the further deposition of additional material 330.

D. NANOFIBER SELECTION

As the active materials generally do not provide much, if any mechanical support, nanofibers in the form of a network of nanofibers can be provided for mechanical support of the active materials in an electrode. In addition to providing a support for the active materials, the network of nanofibers can also be used to conduct electricity (i.e., provide a pathway for electrons) from electrodes to an outside load. A network of nanofibers can be formed by aggregating nanofibers into a random interpenetrating network, which can provide a pathway for electrons to access active material supported by the random interpenetrating network.

Additionally, in order for the battery to be fast, both in charge and discharge, none of the active material can be provided in close proximity with a nanofiber (i.e., in contact). By providing a network of nanofibers to support the active materials, the distance between the active material and a nanofiber in the network of nanofibers can approach zero to allow electrons to flow between the active material and the nanofiber readily.

The terms "nanotube," "fibril," and "carbon nanotube" are used interchangeably to refer to single wall (i.e., only a single graphene layer parallel to the nanotube axis) or multi-wall (i.e., more than one graphene layer more or less parallel to the nanotube axis) carbon nanotubes or other nanoscale sized fibers. Each refers to an elongated structure having a cross-section (e.g., angular fibers having edges) or a diameter (e.g., rounded) of, for example for multi-wall nanotubes, less than 1 micron, less than 0.5 microns, less than 0.2 microns, less than 100 nm, less than 50 nm, less than 20 nm; or for example for single wall nanotubes, less than 5 nanometers. Other types of carbon nanotubes are also known, such as fishbone fibrils (e.g., wherein the graphene sheets are disposed in a herringbone pattern with respect to the nanotube axis), "buckytubes," etc. As produced, carbon nanotubes may be in the form of discrete nanotubes, aggregates of nanotubes (i.e., dense, microscopic particulate structure comprising entangled carbon nanotubes) or a mixture of both. Each of these conformations and structures may be used as "nanofibers" as discussed herein, as each would provide electrically conductive, networkable structures to support active materials.

The term "nanofiber" is broader, encompassing both nanotubes and other nanosized fibers that may not be hollow or may lack the defined orientation of the graphenic sheets or which may be covered with an outer layer of pyrolytic carbon. Further discussion on nanofibers can be found in U.S. Pat. No. 5,800,706 and/or U.S. Pat. No. 6,099,960, which are incorporated in their entireties by reference.

Nanofibers exist in a variety of forms and have been prepared through the catalytic decomposition of various carbon-containing gases at metal surfaces. These include those described in U.S. Pat. No. 6,099,965 to Tennent, et al. and U.S. Pat. No. 5,569,635 to Moy, et al., both of which are hereby incorporated by reference in their entireties.

In an embodiment, nanofibers are made by catalytic growth from hydrocarbons or other gaseous carbon compounds, such as CO, mediated by supported or free floating catalyst particles.

Nanofibers may also be formed as aggregates of carbon nanotubes, which may be dense microscope particulate structures of entangled carbon nanotubes and may resemble the morphology of bird nest ("BN"), cotton candy ("CC"), combed yarn ("CY") or open net ("ON"). Nanofibers may also be grown on a flat support, attached by one end to the support and parallel to each other, forming a "forest" structure. Aggregates are formed during the production of carbon nanotubes and the morphology of the aggregate is influenced by the choice of catalyst support. Porous supports with completely random internal texture, e.g., fumed silica or fumed alumina, grow nanotubes in all directions leading to the formation of bird nest aggregates. Combed yarn and open net aggregates are prepared using supports having one or more readily cleavable planar surfaces, e.g., an iron or iron-containing metal catalyst particle deposited on a support material having one or more readily cleavable surfaces and a surface area of at least 1 square meter per gram.

Individual carbon nanotubes in aggregates may be oriented in a particular direction (e.g., as in "CC," "CY," and "ON" aggregates) or may be non-oriented (i.e., randomly oriented in different directions, for example, as in "BN" aggregates). Carbon nanotube "agglomerates" are composed of carbon nanotube "aggregates." Carbon nanotube "aggregates" retain their structure in the carbon nanotube "agglomerates." As such, "BN" agglomerates, for example, may contain "BN" aggregates.

"BN" structures may be prepared as disclosed in U.S. Pat. No. 5,456,897, for example, which is hereby incorporated by reference in its entirety. "BN" agglomerates are tightly packed with typical densities of greater than 0.1 g/cc, for example, 0.12 g/cc. Transmission electron microscopy ("TEM") reveals no true orientation for carbon nanotubes formed as "BN" agglomerates. Patents describing processes and catalysts used to produce "BN" agglomerates include U.S. Pat. Nos. 5,707,916 and 5,500,200, both of which are hereby incorporated by reference in their entireties.

On the other hand, "CC," "ON," and "CY" agglomerates have lower density, typically less than 0.1 g/cc, for example, 0.08 g/cc and their TEMs reveal a preferred orientation of the nanotubes. U.S. Pat. No. 5,456,897, hereby incorporated by reference in its entirety, describes the production of these oriented agglomerates from catalyst supported on planar supports. "CY" may also refer generically to aggregates in which the individual carbon nanotubes are oriented, with "CC" aggregates being a more specific, low density form of "CY" aggregates.

Carbon nanotubes are distinguishable from commercially available continuous carbon fibers. For instance, the diameter of continuous carbon fibers, which is always greater than 1.0 micron and typically 5 to 7 microns, is also far larger than that of carbon nanotubes, which is usually less than 1.0 micron. Carbon nanotubes also have vastly superior strength and conductivity than carbon fibers.

Carbon nanotubes also differ physically and chemically from other forms of carbon such as standard graphite and carbon black. Standard graphite is, by definition, flat.

Carbon black is an amorphous structure of irregular shape, generally characterized by the presence of both sp2 and sp3 bonding. On the other hand, carbon nanotubes have one or more layers of ordered graphitic carbon atoms disposed substantially concentrically about the cylindrical axis of the nanotube. These differences, among others, make graphite and carbon black poor predictors of carbon nanotube chemistry.

"Multi-wall nanotubes" as used herein refers to carbon nanotubes which are substantially cylindrical, graphitic nanotubes of substantially constant diameter and comprise cylindrical graphitic sheets or layers whose c-axes are substantially perpendicular to the cylindrical axis, such as those described, e.g., in U.S. Pat. No. 5,171,560 to Tennent, et al. The term "multi-wall nanotubes" is meant to be interchangeable with all variations of said term, including but not limited to "multi-wall nanotubes," "multi-walled nanotubes," "multiwall nanotubes," etc.

"Single wall nanotubes" as used herein refers to carbon nanotubes which are substantially cylindrical, graphitic nanotubes of substantially constant diameter and comprise a single cylindrical graphitic sheet or layer whose c-axis is substantially perpendicular to the cylindrical axis, such as those described, e.g., in U.S. Pat. No. 6,221,330 to Moy, et al. The term "single wall nanotubes" is meant to be interchangeable with all variations of said term, including but not limited to "single-wall nanotubes," "single-walled nanotubes," "single wall nanotubes," etc.

It is understood that multiwall carbon nanotubes may be readily functionalized.

Methods of functionalizing nanotubes are discussed in U.S. Pat. Nos. 6,203,814, 7,413,723, and 6,872,681, which are incorporated by reference in their entireties. Such functionalized multiwall carbon nanotubes may be more readily dispersed in aqueous media than as-made, non-functionalized multiwall carbon nanotubes. Either functionalized or as-made nanotubes may be used herein.

Generally, functionally modified nanotubes may aggravate side reactions of an aqueous electrolyte with the functionally modified nanotubes. However, the functional groups on the surface may be beneficial for better adherence of active material 330 to a nanofiber. In one implementation, the step of redistributing active material on coated nanofiber network 830 may be helped by functional groups. After the redistribution, the nanofibers will no longer be in direct contact with electrolyte (as the nanofibers will be coated); therefore side reactions may be minimized. The conductivity of nanofiber networks depends not only on the inherent conductivity of the nanofibers, but also upon the average length and spatial density of the fibers in the network. Network resistance is believed to derive mainly from the fiber-fiber resistance at the intersections.

E. ACTIVE MATERIAL SELECTION

The terms "active material" and "electroactive agent" are used interchangeably to refer to chemical compounds that provide chemical energy for conversion to electrical energy in a battery. The active material may be an electrochemically active material in that it may be a substance that can participate in the release or acceptance of an electron. The active material may also be provided on a nanoscale level. In one embodiment, the active material may be electrochemically active nanoscale solid substances, such as nanoscale sized particles of electrochemically active material.

The choice of active material for a battery depends on factors other than energy density and power density. These include, but are not limited to: cost, safety, life, reliability, temperature stability, failure mode, etc. In embodiments provided herein, electrodes are provided that can improve the power density of any battery system or individual electrode. Electrode chemistries known to be reversible are, however, preferred. These include, but are not limited to $NiOOH/Ni(OH)_2$; $Zn/ZnOH$; $Cd/Cd(OH)_2$; $Fe/Fe(OH)_2$; $Pb/Pb(OH)_2$; $Pb/PbSO_4$; $MnO_2/Mn_2O_3$; $PbO_2/PbSO_4$; $Co/Co(OH)_2$; $Ag/AgO$; $Al/Al_2O_3$; $Mg/Mg(OH)_2$, Metal/Metal Hydride; etc.

In one embodiment, the active material may be provided by depositing the active material in nanoscale sized form from solution. In one embodiment, the active material may be nanoscale solid material after deposition on a nanofiber.

Additionally, the active material, upon application, may provide insulation from an electrolyte in an electrode, as described herein. In one embodiment, the active material may reduce or prevent interaction between the nanofibers and electrolyte in an electrode. For example, by utilizing the methods provided herein, side reactions between the nanofibers and the electrolyte may be reduced by the presence of the active material insulating the nanofibers from the electrolyte.

Systems compatible with an aqueous electrolyte are also preferred because aqueous electrolytes can better exploit the energy density of the batteries described herein.

F. ELECTRODE FORMATION

In embodiments herein, electrodes can be made or provided in the form of a two dimensional sheet or mat. If a two dimensional sheet is provided, then the sheet may be assembled into a device with a current collector. For example, a current collector can be provided in the form of a foil or conductive layer aligned in parallel to the electrode and in intimate contact therewith. The through sheet conductivity of the electrode must be high enough not to limit the power density of the battery.

If a three dimensional mat is provided, then the mat may have a thickness as desired. While the performance of the electrode may vary with the thickness of the active material, such variations may also occur based upon different active materials.

In one embodiment, a coated nanotube network electrode can function as its own current collector. In this case, the coated nanotube network electrode can be connected to an outside load (or to other cells in the stack) through its edges, which causes the conductivity in the direction of the electrode plane (the x-y conductivity) to become critical to the cell resistance. This cell resistance may be less 200 ohms-cm, more preferably less than 100 ohms-cm, and still more preferably less than 50 ohms-cm.

G. EMBODIMENTS

In one embodiment, a nanofiber-$MnO_2$ electrode can be paired with a nanofiber-Zn electrode to provide a pair of fast fibril (nanofiber) electrodes in a battery. In other embodiments, electrodes with nanofibers and compounds of Zn, Co, Cd, Fe, and/or Pb can be paired with electrodes with nanofibers and compounds of Ni to provide fast fibril electrodes.

In one embodiment, a nanofiber electrode may contain more active material than nanofibers to allow for more active material to be present in an electrode. For example, a nanofiber electrode may contain less than 50 wt. % nanofibers. In another example, a nanofiber electrode may contain less than 25 wt. % nanofibers, which may also include more than 75 wt. % active material.

In one embodiment, a nanofiber electrode can have a porosity level that allows enough electrolyte to complete charge and discharge without precipitation. For example, a nanofiber electrode may contain a network with a volume of porosity of 50 to 90 vol. %, which can allow for sufficient levels of electrolyte to complete charge and discharge without precipitation. As another example, a nanofiber electrode may contain a network with a volume porosity of 50 to 80 vol. % to increase the electrode volume devoted to active ingredients, as porosity reduces electrode volume that could be devoted to active material.

In one embodiment, active materials 330 and electrolytes, in combination with the nanofiber electrode, may be chosen such that a charge-discharge efficiency can be greater than 90%. In another embodiment, active materials 330 and electrolytes, in combination with the nanofiber electrode, may be chosen such that a charge-discharge efficiency can be greater than 95%. For example, an electrode with Zn active material 330 with a $K_2CO_3$ electrolyte may provide a charge-discharge efficiency greater than 90% (as discussed further below).

It should be recognized that embodiments herein are describing the electrochemical aspects of the preferred electrodes. Other components may be added to the paste or mat for the electrodes to alter physical or electrical properties. Binders, additives to improve conductivity, cycle life, thermal stability, charge retention, shelf life, structural integrity, or other parameters may be employed. Generally, the quantity of additives should be small enough not to materially alter the energy or power density of the electrodes. For example, additives may preferably be added at less than 20 wt. % of the electrode, more preferably less than 10 wt. % of the electrode, and even more preferably less than 5 wt. % of the electrode. Examples of additives can be found in U.S. Pat. No. 6,790,559 (e.g., additives to Ni electrode: fluoride salts 0.1-1% for active material utilization) and U.S. Pat. No. 6,811,926 (e.g., additives to Zn electrodes: inorganic fibers (alumina and silica, 2-15%) and bismuth oxide (2-10%) for cycle life), both of which are incorporated by reference in their entireties.

In one embodiment, asymmetrical electrodes may be used in an energy storage device. For example, a nanofiber electrode provided herein may be combined with a traditional electrode to modify an existing battery. As another example, a nanofiber electrode provided herein may be combined with an electrochemical capacitor (i.e., supercapacitor) electrode to modify an existing supercapacitor.

H. EXAMPLES

Example 1—Method of Making an Electrode

Initially, active material 330 can be introduced into a network forming step by a prior "rough" deposition onto only a fraction of the nanofibers, in an aqueous electrolyte whose anion forms only a sparingly soluble salt, $NiCO_3$ or $ZnCO_3$, for example, with a cation of active material 330. A sparingly soluble salt may be any salt with solubility less than 1 g/100 g, but greater than zero. In one embodiment, the sparingly soluble salt may have solubility greater than zero and less than 0.1 g/100 g. For example, the sparing soluble salt may include, but is not limited to hydroxides, carbonates, fluorides, sulfates, oxalates, phosphates.

The sparingly soluble salt may be provided as an intermediate to assist in any redistribution of coating. If the sparingly soluble salt has been prior deposited onto a fraction of the nanofibers, then the network forming step can include both "roughly coated" and "plain" (non-coated/undeposited) nanofibers.

Using method 200 described above, first nanofibers 310, preferably non-oxidized nanofibers, can be provided in a liquid vehicle that may include a readily soluble salt, such as $Ni(NO_3)_2$ or $ZnSO_4$, for example. Non-oxidized or oxidized fibers may be used. Further discussion of non-oxidized and oxidized fibers can be found in U.S. Pat. No. 7,413,723, which is incorporated in its entirety by reference.

A readily soluble salt as used herein may be any soluble compound that can form a sparingly soluble compound of the desirable chemistry. Chlorides, nitrates, bicarbonates, some sulfates, and other soluble salts may be used for the step of deposition of active material 220 of method 200. Next, a reactant, such as $K_2CO_3$ or KOH, can be added to the liquid vehicle, which includes a soluble salt, and the reactant can combine with the soluble salt to deposit the corresponding sparingly soluble salt on coated nanofibers 310. This sparingly soluble salt can become active material 330 after step 240 in method 200, discussed above.

Next, a repeated charge and discharge may be applied to a network of coated nanofibers 310 and non-coated nanofibers 315 in an appropriate electrolyte to redistribute active material 330 over all the nanofibers 310, 315 to form a coated nanofiber network 830.

Optionally, a "local buffer" can be provided in coated nanofibers 310, non-coated nanofibers 315, or both. In one implementation, the local buffer can be deposited together with the sparingly soluble salt (that will become active material 330), or before or after depositing the sparingly soluble salt.

In one implementation, the local buffer may include an oxide, a hydroxide, or a carbonate. For example, the local buffer may include an oxide, a hydroxide, or a carbonate of Mg or Ca. As another example, the local buffer may include $Mg(OH)_2$ or $Ca(OH)_2$. In one embodiment, the local buffer may be $Mg(OH)_2$ and the active material for the two electrodes may be $Ni(OH)_2$ and $Zn(OH)_2$, respectively.

Co-depositing active material 330 and the local buffer can improve electrode performance, which can be measured by % charge recovery. In one implementation, a local buffer may be co-deposited with active material 330 on nanofibers 310, deposited on nanofibers 310 after active material 330, deposited on nanofibers 315, or deposited on both coated nanofibers 310 and nanofibers 315. In one implementation, a local buffer may be added in amounts of 20% to 100% chemical equivalent to the amount of active material 330.

While not wishing to be bound by theory, a local buffer, such as $Mg(OH)_2$, may create a locally increased pH within a network of non-coated nanofibers, which in turn may improve the performance of a half-cell reaction, such as $Ni(OH)_2$ oxidation or $Zn(OH)_2$ reduction. On the Zn side the increased pH may favor Zn reduction over hydrogen evolution, while on the Ni side, the locally increased pH may allow the charge process to operate in a more neutral electrolyte than a concentrated caustic electrolyte, which can alternatively be used.

Additionally, a different electrolyte may be used for electrode preparation than for cell use. In one embodiment, a concentrated caustic electrolyte (i.e., a pH greater than 14), such as KOH, can be used for electrode preparation and a different, more neutral electrolyte (i.e., a pH between 7 and 12), such as $K_2CO_3$, can be used for cell use. In one implementation, an electrolyte for electrode assembly can be selected based on solubility of the intermediate salt, while another electrolyte for cell use can be selected based on the stability of the active materials. For example, $Ni(OH)_2$ electrodes may be removed from a KOH electrode preparation electrolyte solution and transferred to a carbonate electrolyte for cell use. In another embodiment, a neutral electrolyte, such as $K_2SO_4$, may be used for preparation of $PbSO_4$ electrode, and a different electrolyte, such as $H_2SO_4$, may be used for cell use.

Example 2—Method of Making a Battery

In one embodiment, a Ni—Zn battery with a carbonate electrolyte is provided.

A Ni electrode material of nanofibers and active material was prepared as follows:
a. 30 mg of CC morphology nanofibers were sonicated in 100 ml deionized (DI) water with 2 drops of Triton X-100™ surfactant.
b. ⅓ of the suspension was left aside.
c. 3 mM $Ni(NO_3)_2$*$6H_2O$ and 1.5 mM $MgCl_2$ were dissolved in the ⅔ of the suspension.
d. 4.5 mM $K_2CO_3$ were dissolved in 10 ml DI water and added drop-by-drop to the suspension to precipitate $NiCO_3$ and $MgCO_3$.
e. The mixture was brought to boil, then cooled to facilitate precipitation of $MgCO_3$.
f. The ⅓ of the suspension that was left aside, which contains non-coated nanofibers were added to the ⅔ of the suspension (i.e., the suspension containing $NiCO_3$ and $MgCO_3$ precipitate) and stirred, then filtered on a nylon membrane.
g. The remaining material removed from the filtration was dried at 120° C.
h. The material exhibited a weight gain of 401 mg of which is estimated to be about 126 mg $MgCO_3$ (1.5 mM) and about 275 mg $NiCO_3$ (2.3 mM).

The Zn electrode material was prepared as follows:
a. 20 mg CC fibrils were sonicated in 100 ml DI water with 2 drops of Triton X-100™ surfactant.
b. ⅓ of the suspension was left aside.
c. 1.5 mM $ZnSO_4$ were added to the ⅔ of the suspension and precipitated drop-by-drop with 1.5 mM $K_2CO_3$ (dissolved in 10 ml DI water).
d. 1.5 mM $MgCl_2$ were added to the suspension and precipitated drop-by-drop with 3 mM KOH (dissolved in 10 ml DI water).

e. The remaining ⅓ of the fibrils were added, stirred well and filtered on a nylon membrane.
f. The material was dried at 120° C.
g. The material exhibited a weight gain of 225 mg which is estimated to be about 87 mg $Mg(OH)_2$ (1.5 mM) and about 138 mg $ZnCO_3$ (1.1 mM).

Figure 10:
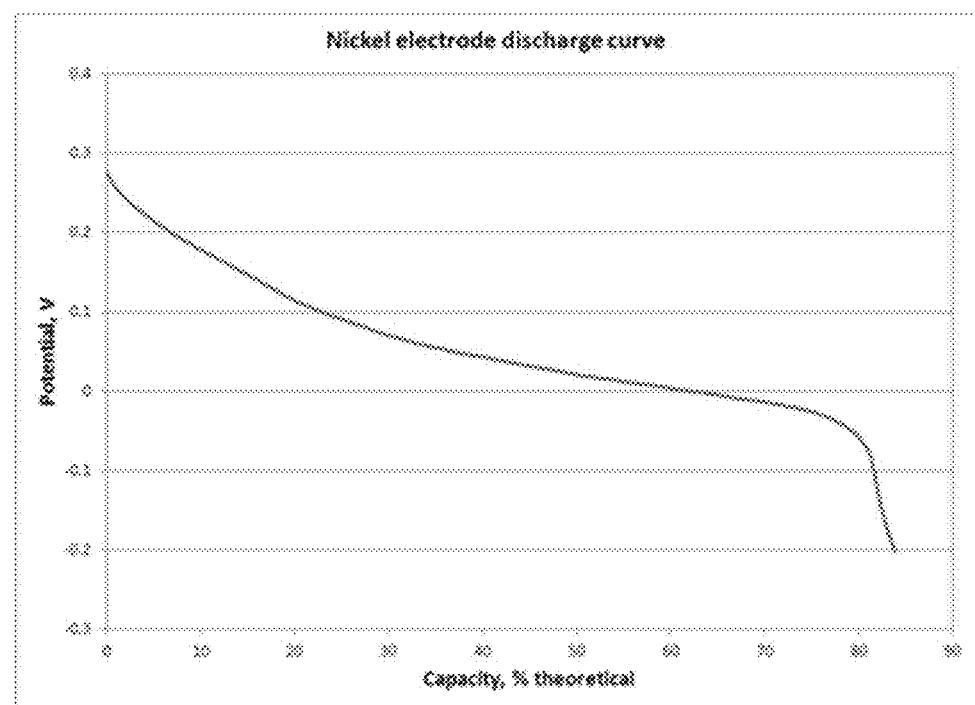
FIG. 10 is an example graphical illustration of discharge results for an example nanofiber-nanoscale electrode containing Ni compounds.

The Ni electrode was prepared as follows:
a. Nickel material (40 mg→0.21 mM Ni, C rate=5.7 mA) was wetted with 30% KOH and crushed into a paste.
b. The paste was placed in a single electrode cell with a conductive film as a current collector (backed up by a nickel plate).
c. The electrode was charged and discharged twice in 30% KOH electrolyte at ~2C rate with a Pt plate as a counter-electrode. The second discharge gave 84% of the theoretical capacity. See FIG. 10, which is an example graphical illustration of discharge results for an example nanofiber-nanoscale Ni electrode. If repeated several more times (not shown here), the charge-discharge efficiency would approach 100%, which indicates that practically no side reaction of water decomposition and oxygen evolution takes place on a thusly prepared electrode.
d. Without taking the electrode from the cell, it was rinsed with DI water.

Figure 11:
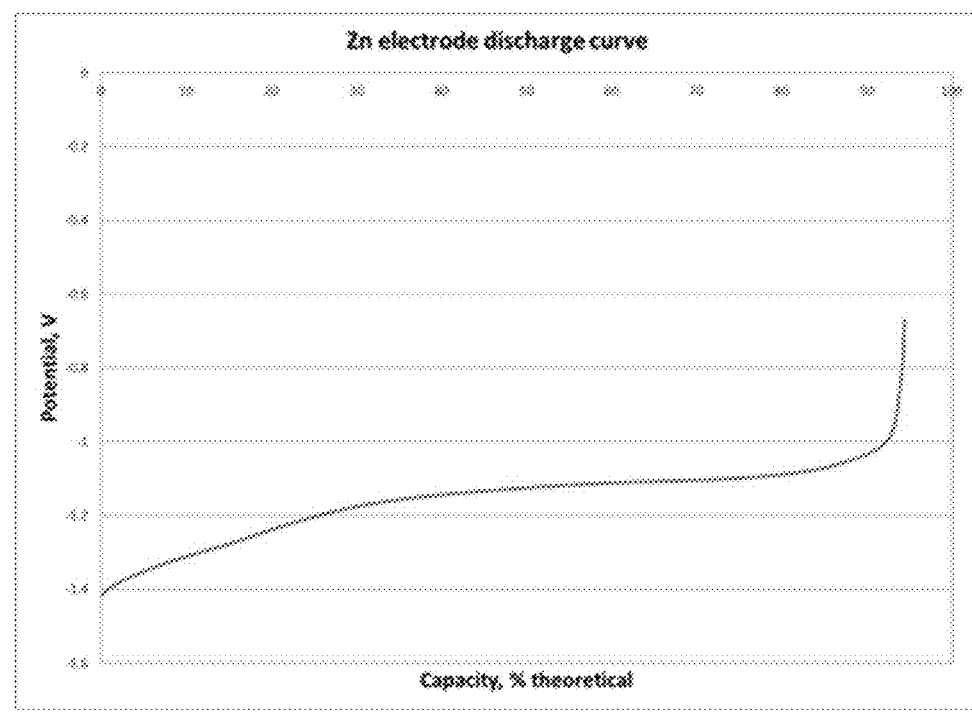
FIG. 11 is an example graphical illustration of discharge results for an example nanofiber-nanoscale electrode containing Zn compounds.

The Zn electrode was prepared as follows:
a. Zn material (23 mg→0.10 mM Zn, C rate=5.5 mA) was wetted with electrolyte (30% $K_2CO_3$, saturated with ZnO).
b. The material was placed in a single electrode cell with conductive film as a current collector (backed up by a nickel plate).
c. The electrode was charged and discharged once at 2C rate with a Pt plate as a counter-electrode. The discharge gave 94% of the theoretical capacity. See FIG. 11, which is an example graphical illustration of discharge results for an example nanofiber-nanoscale Zn electrode.
d. The Pt plate and the reference electrode (Ag/AgCl) were removed from the cell, and the nickel electrode was placed in the beaker instead.
e. The cell was charged at a constant current of 2C rate for the first 6 cycles, and then at different constant voltages.

Figure 12:
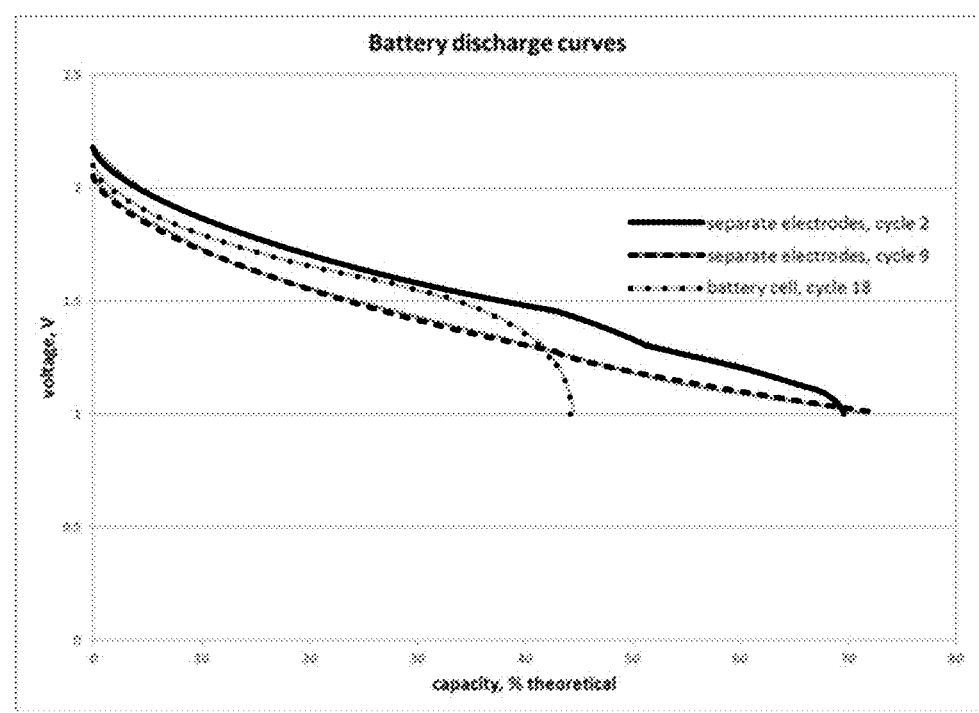
FIG. 12 is an example graphical illustration of discharge results for example nanofiber-nanoscale electrodes after 2 charge-discharge cycles as separate electrodes, 9 charge-discharge cycles as separate electrodes, and 18 charge-discharge cycles as a battery cell (i.e., combined electrodes).

The Zn—Ni electrodes in the separate fixtures gave 70% capacity at 2C rate. FIG. 12 is an example graphical illustration of discharge results for example nanofiber-nanoscale electrodes after 2 charge-discharge cycles as separate electrodes, 9 charge-discharge cycles as separate electrodes, and 18 charge-discharge cycles as a battery cell (i.e., combined electrodes). It can be seen in FIG. 12 that at around the 1V cutoff voltage the battery is not fully discharged. To see the full capacity, following the discharge at 2C rate, the battery was discharged at 0.2C rate (the cutoff voltage was kept at 1V). In the second cycle, full returned capacity was 74%, in the $9^{th}$ cycle—82%. However, the voltage was deteriorating, because the charge efficiency in the first cycles was not high enough. It started at ~85%, and it came up to 90% in the $10^{th}$ cycle. It is believed that additional cycles may allow for an individual charge efficiency closer to 100%.

After the $13^{th}$ cycle, 30 minutes were allowed to pass between the charge and the discharge, and the result was compared with the returned capacity of the $12^{th}$ cycle, which had no delay. The amount of charge was the same for these two cycles. The difference between total returned capacities in these two cycles was less than 4%.

After the $14^{th}$ cycle, the samples were placed in the battery cell. In FIG. 12, a discharge curve of the battery is illustrated at 2C rate. In the process of moving the samples, some capacity appeared to be lost, but the voltages, as expected, improved.

The above example illustrates a Ni—Zn battery which utilizes two electrodes formed from coated nanofibers and a relatively neutral electrolyte. The Ni—Zn battery can exhibit high power characteristics due to the nanoscale nature of the active material, as well as high stability of the electrodes in the chosen electrolyte.

A nanofiber/NiOOH electrode and a nanofiber/Zn electrode can be made that are capable of high rate charge and discharge. However, in a standard 30% KOH electrolyte the Zn electrode can be unstable, and can dissolve as a zincate ion quickly. In order to overcome this problem, a less active 30% $K_2CO_3$ electrolyte can be used. Zn is expected to be much more stable in the absence of the excess of $OH^-$ ions. Yet, the hydroxyl ions can be used for the charge cycle of the battery.

On the anode side, the higher the pH, the lower amount of $H_2$ is formed, since the potential of hydrogen evolution directly depends on the pH of the electrolyte. On the cathode side, acid may be formed during the charge, which may need neutralization to prevent or reduce the effects of the acid on the Ni active material and also to reduce conversion of carbonate ions to $CO_2$ gas. In order to provide $OH^-$ ions, $Mg(OH)_2$ can be added to the active material. Magnesium hydroxide, as well as magnesium carbonate, may not be soluble in the electrolyte, and would be expected to transform back and forth without leaving the places of initial deposition.

In one example battery, the battery may include two electrodes with different electrode chemistries. In this implementation, one of the two electrodes may include nanofibers, such as carbon nanotubes. In this implementation, the nanofiber containing electrode may have a volume porosity greater than 50%, 60%, 70%, or 80%. Additionally, the nanofiber containing electrode may include less than 25 wt. %, 20 wt. %, 15 wt. %, or 10 wt. % nanofibers. Additionally, the battery, when discharged at ambient conditions at a 1C rate, may have a cell voltage greater than 80%, 85%, 90%, or 95% of the theoretical voltage. Additionally, the battery may have a recharge efficiency when recharged at 2C rate greater than 95%, 98%, or 99%. The battery may also include an electrolyte that has a pH below 12.5, which may contain $K_2CO_3$. The nanofiber containing electrode may also not include a current collector separate from the nanofibers in the electrode. Additionally, the two electrodes may be an electrode containing a Ni compound or an electrode containing a Zn compound.

Electrodes described herein may be used in batteries. The electrodes can be provided in single-use, non-rechargeable batteries (often referred to as "primary batteries") or multiple use, rechargeable batteries (often referred to as "secondary batteries"). The electrodes can also be provided in flexible batteries, or other types of batteries.

While the invention has been described in detail with reference to preferred embodiments thereof, it will be apparent to those skilled in the art that variations and modifications can be made, and equivalents employed without departing from the scope of the appended claims.

What is claimed is:
1. An electrode, comprising:
a nano-scale coated network, comprising:
first carbon nanotubes;
second carbon nanotubes; and
an active material coating, wherein the first carbon nanotubes are electrically connected to at least one of the second carbon nanotubes to form an underlying nano-scale network, wherein the underlying nano-scale network comprises the first carbon nanotubes, the second carbon nanotubes, and at least one electrical contact connection between at least two of the second carbon nanotubes, wherein the active material coating forms the nano-scale coated network by covering the first carbon nanotubes while not interfering with the at least one electrical contact connection between the second carbon nanotubes to form the nano-scale coated network, and wherein portions of the active material coating from the first carbon nanotubes are on portions of the second carbon nanotubes.

2. The electrode of claim 1, wherein the active material coating coats the entirety of at least one of the first carbon nanotubes, and does not coat the entirety of at least one of the second carbon nanotubes.

3. The electrode of claim 1, wherein the first carbon nanotubes and the second carbon nanotubes form a random interpenetrating network of carbon nanotubes.

4. The electrode of claim 1, wherein the first carbon nanotubes and the second carbon nanotubes comprise at most 50% by weight of the nano-scale coated network, and the active material coating comprises at least 50% by weight of the nano-scale coated network.

5. The electrode of claim 1, wherein the active material coating comprises at least 70% by weight of the nano-scale coated network.

6. The electrode of claim 1, wherein the at least one electrical contact connection comprises a direct physical contact connection between second carbon nanotubes.

7. The electrode of claim 1, wherein the nano-scale coated network has a volume of porosity of 50 to 90 vol. %.

8. The electrode of claim 1, wherein the active material coating comprises an electroactive agent.

9. The electrode of claim 1, wherein the active material coating comprises a compound of Ni, Zn, Cd, Fe, Pb, Mn, Co, Ag, Al, or Mg.

10. The electrode of claim 1, wherein the active material coating comprises a compound of Ni or Zn.

11. The electrode of claim 1, wherein at least a portion of the first carbon nanotubes or a portion of the second carbon nanotubes comprises a current collector.

12. An electrode comprising:
a nano-scale coated network, comprising:
 first carbon nanotubes;
 second carbon nanotubes; and
 an active material coating,
  wherein the first carbon nanotubes are electrically connected to the second carbon nanotubes to form a nano-scale network,
  wherein at least a first of the second carbon nanotubes is in electrical contact with a second of the second carbon nanotubes;
  wherein the active material coating covers portions of the first carbon nanotubes and portions of the first of the second carbon nanotubes,
  wherein the first of the second carbon nanotubes is in direct physical contact with the second of the second carbon nanotubes under the active material coating covering the portions of the first of the second carbon nanotubes, and
  wherein portions of the active material coating from the first carbon nanotubes are on portions of the second carbon nanotubes.

13. The electrode of claim 12, wherein the active material coating is redistributed from a surface of a first multi-wall carbon nanotube to a surface of a second multi-wall carbon nanotube, and wherein the second multi-wall carbon nanotube is in direct contract with another second multi-wall carbon nanotube.

14. The electrode of claim 13, wherein the active material coating is treated using electrical charge and discharge to form the first electrode, or recrystallization to form the first electrode.

15. The electrode of claim 12, further comprising an electrolyte, wherein the electrolyte comprises an aqueous solution with a pH below 12.5.

16. The electrode of claim 12, wherein the active material coating includes a compound of Zn, Cd, Co, Ni, Fe, Pb, Al, Mn, or Ag.

17. The electrode of claim 12, wherein the active material coating comprises a compound of Ni or Zn.

18. A battery, comprising:
two electrodes with different electrode chemistries, wherein one of said electrodes comprises carbon nanotubes (CNT), said CNT containing electrode having volume porosity greater than 50%, said CNT electrode comprising less than 25% CNT by weight, said battery, when discharged at ambient conditions at a 1C rate, having a cell voltage greater than 80% of the theoretical voltage, said battery having a recharge efficiency, when recharged at 2C rate, of greater than 95%, wherein at least two CNT are in direct physical contact with each other; and
wherein at least one of the electrodes comprises a nano-scale coated network with first carbon nanotubes covered with active material, and second carbon nanotubes partially covered with active material and partially bare of active material in portions of the second carbon nanotubes that contact other second carbon nanotubes.

19. The battery of claim 18, wherein the nanotube containing electrode has a volume porosity greater than 60%.

20. The battery of claim 18, wherein one electrode of the two electrodes comprises an electrode containing a Ni compound, wherein the other electrode of the two electrodes comprises an electrode containing a Zn compound, and wherein the CNT containing electrode is the electrode containing the Ni compound or the electrode containing the Zn compound.

* * * * *